United States Patent
Francis et al.

(10) Patent No.: US 12,508,327 B2
(45) Date of Patent: Dec. 30, 2025

(54) METHODS OF TREATING OR PREVENTING AMYOTROPHIC LATERAL SCLEROSIS

(71) Applicant: Rowan University, Glassboro, NJ (US)

(72) Inventors: Jeremy Francis, Cherry Hill, NJ (US); Paola Leone, Cherry Hill, NJ (US)

(73) Assignee: Rowan University, Glassboro, NJ (US)

( * ) Notice: Subject to any disclaimer, the term of this patent is extended or adjusted under 35 U.S.C. 154(b) by 998 days.

(21) Appl. No.: 17/270,553

(22) PCT Filed: Aug. 30, 2019

(86) PCT No.: PCT/US2019/048985
§ 371 (c)(1),
(2) Date: Feb. 23, 2021

(87) PCT Pub. No.: WO2020/047368
PCT Pub. Date: Mar. 5, 2020

(65) Prior Publication Data
US 2021/0177989 A1     Jun. 17, 2021

Related U.S. Application Data

(60) Provisional application No. 62/724,780, filed on Aug. 30, 2018.

(51) Int. Cl.
*A61K 48/00* (2006.01)
*C12N 15/86* (2006.01)

(52) U.S. Cl.
CPC ............ *A61K 48/005* (2013.01); *C12N 15/86* (2013.01); *C12N 2750/14143* (2013.01); *C12N 2750/14171* (2013.01); *C12Y 305/01015* (2013.01)

(58) Field of Classification Search
CPC .................. A61K 48/005; C12N 15/86; C12N 2750/14143; C12N 2750/14171; C12Y 305/01015
See application file for complete search history.

(56) References Cited

U.S. PATENT DOCUMENTS

| | | | |
|---|---|---|---|
| 6,723,315 | B1 | 4/2004 | Mallet et al. |
| 2010/0315048 | A1 | 12/2010 | De Sousa et al. |
| 2013/0195801 | A1 | 8/2013 | Gao et al. |
| 2013/0323229 | A1* | 12/2013 | Leone ............ C12Y 305/01015 435/320.1 |
| 2014/0335054 | A1* | 11/2014 | Gao .................. C12N 15/8645 424/93.2 |

FOREIGN PATENT DOCUMENTS

| | | |
|---|---|---|
| JP | 2001504088 A | 3/2001 |
| JP | 2011504088 A | 1/2011 |
| JP | 2013531471 A | 8/2013 |
| JP | 7587275 B2 | 11/2024 |
| WO | 2011133890 A1 | 10/2011 |
| WO | 2017181105 A1 | 10/2017 |

OTHER PUBLICATIONS

Bellingham, Mark C. "A review of the neural mechanisms of action and clinical efficiency of riluzole in treating amyotrophic lateral sclerosis: what have we learned in the last decade?." CNS neuroscience & therapeutics 17.1 (2011): 4-31. (Year: 2011).*
Campbell, Graham R., and Don J. Mahad. "Mitochondria as crucial players in demyelinated axons: lessons from neuropathology and experimental demyelination." Autoimmune diseases 2011 (2011). (Year: 2011).*
Zhou, Ting, et al. "Implications of white matter damage in amyotrophic lateral sclerosis." Molecular medicine reports 16.4 (2017): 4379-4392. (Year: 2017).*
Tsai, Guochuan, et al. "Reductions in acidic amino acids andN-acetylaspartylglutamate in amyotrophic lateral sclerosis CNS." Brain research 556.1 (1991): 151-156. (Year: 1991).*
Nathan Hardcastle et al: "AAV gene delivery to the spinal cord: serotypes, methods, candidate diseases, and clinical trials", Expert Opinion on Biological Therapy, vol. 18, No. 3, Dec. 18, 2017 (Dec. 18, 2017), pp. 293-307, XP055630455, ISSN: 1471-2598, DOI: 10.1080/14712598.2018.1416089.
Supplemental European Search Report issued in European Application No. 19853527 dated May 30, 2022.
Simone et al., "Serum N-acetylaspartate Level in Amyotrophic Lateral Sclerosis," Arch. Neurol. (2011); 68(10): pp. 1308-1312.
Ghiasi et al., "Mitochondrial complex I deficiency and ATP/ADP ratio in lymphocytes of amyotrophic lateral sclerosis patients," Neruological Research (2012); 34(3): pp. 297-303.
Mali et al., "A Novel Decoy That Interrupts G93A-Superoxide Dismutase Gain of Interaction with Malate Dehydrogenase Improves Survival in an Amyotropic Lateral Sclerosis Cell Model," J. Med. Chem. (2009); 52: pp. 5442-5448.
Tsai et al., "Reductions in acidic amino acids andN-acetylaspartylglutamate in amyotrophic lateral sclerosis CNS," Aug. 9, 1991, Brain Research, vol. 556, pp. 151-156.
Zhou et al. "Implications of white matter damage in amyotrophic lateral sclerosis (Review)," Aug. 7, 2017, Molecular Medicine Reports, vol. 16, pp. 4379-4392, DOI: 10.3892/mmr.2017.7186.
Meininger et al., "Glatiramer acetate has no impact on disease progression in ALS at 40 mg/day: A double-blind, randomized, multicentre, placebo-controlled trial," Oct.-Dec. 2009, Amyotrophic Lateral Sclerosis, vol. 10(5-6), pp. 378-383.

* cited by examiner

*Primary Examiner* — Ekaterina Poliakova-Georgantas
*Assistant Examiner* — John Charles McKillop
(74) *Attorney, Agent, or Firm* — Fox Rothschild LLP

(57) ABSTRACT

This disclosure provides methods for treating, ameliorating, or reversing at least one symptom of amyotrophic lateral sclerosis (ALS) in a subject by increasing the amount of neuronal aspartate in spinal cord through administration of a therapeutically effective amount of a composition comprising a nucleic acid encoding ASPA or a functional fragment thereof.

20 Claims, 9 Drawing Sheets
Specification includes a Sequence Listing.

FIG. 4A
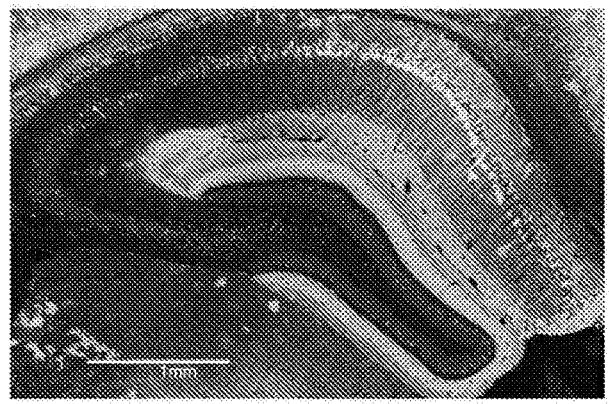
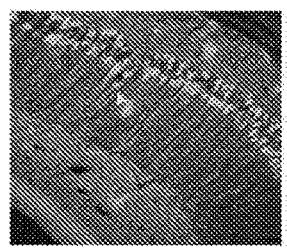 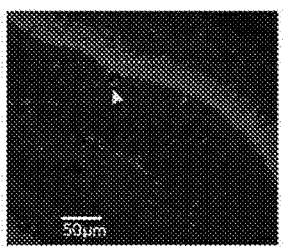 
FIG. 4B     FIG. 4C     FIG. 4D
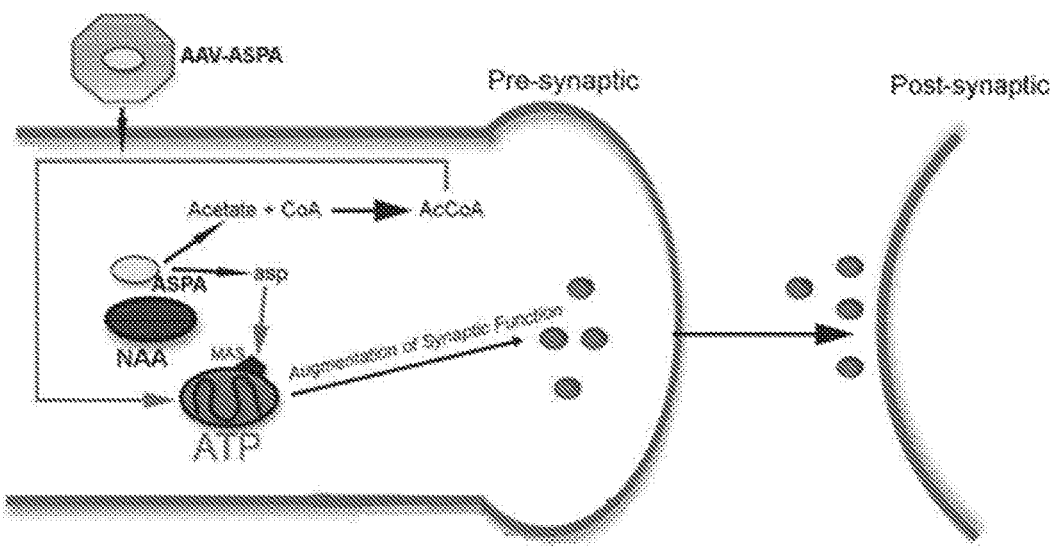
FIG. 5

1. Transfect HeLa Cells with WT or E285A Expressing Plasmids

2. Harvest and Lyse Cells

3. Add Lysate to Catabolic Reaction Containing 5mM NAA

4. Add Catabolic Reaction Product to Mitochondria to Assay ATP

SEQUENCE LISTING

<160> NUMBER OF SEQ ID NOS: 1

<210> SEQ ID NO 1
<211> LENGTH: 313
<212> TYPE: PRT
<213> ORGANISM: homo sapiens

<400> SEQUENCE: 1

Met Thr Ser Cys His Ile Ala Glu Glu His Ile Gln Lys Val Ala Ile
1               5                   10                  15

Phe Gly Gly Thr His Gly Asn Glu Leu Thr Gly Val Phe Leu Val Lys
            20                  25                  30

His Trp Leu Glu Asn Gly Ala Glu Ile Gln Arg Thr Gly Leu Glu Val
        35                  40                  45

Lys Pro Phe Ile Thr Asn Pro Arg Ala Val Lys Lys Cys Thr Arg Tyr
    50                  55                  60

Ile Asp Cys Asp Leu Asn Arg Ile Phe Asp Leu Glu Asn Leu Gly Lys
65                  70                  75                  80

Lys Met Ser Glu Asp Leu Pro Tyr Glu Val Arg Arg Ala Gln Glu Ile
                85                  90                  95

Asn His Leu Phe Gly Pro Lys Asp Ser Glu Asp Ser Tyr Asp Ile Ile
            100                 105                 110

Phe Asp Leu His Asn Thr Thr Ser Asn Met Gly Cys Thr Leu Ile Leu
        115                 120                 125

Glu Asp Ser Arg Asn Asn Phe Leu Ile Gln Met Phe His Tyr Ile Lys
130                 135                 140

Thr Ser Leu Ala Pro Leu Pro Cys Tyr Val Tyr Leu Ile Glu His Pro
145                 150                 155                 160

Ser Leu Lys Tyr Ala Thr Thr Arg Ser Ile Ala Lys Tyr Pro Val Gly
                165                 170                 175

Ile Glu Val Gly Pro Gln Pro Gln Gly Val Leu Arg Ala Asp Ile Leu
            180                 185                 190

Asp Gln Met Arg Lys Met Ile Lys His Ala Leu Asp Phe Ile His His
        195                 200                 205

Phe Asn Glu Gly Lys Glu Phe Pro Pro Cys Ala Ile Glu Val Tyr Lys
    210                 215                 220

Ile Ile Glu Lys Val Asp Tyr Pro Arg Asp Glu Asn Gly Glu Ile Ala
225                 230                 235                 240

Ala Ile Ile His Pro Asn Leu Gln Asp Gln Asp Trp Lys Pro Leu His
                245                 250                 255

Pro Gly Asp Pro Met Phe Leu Thr Leu Asp Gly Lys Thr Ile Pro Leu
            260                 265                 270

Gly Gly Asp Cys Thr Val Tyr Pro Val Phe Val Asn Glu Ala Ala Tyr
        275                 280                 285

Tyr Glu Lys Lys Glu Ala Phe Ala Lys Thr Thr Lys Leu Thr Leu Asn
    290                 295                 300

Ala Lys Ser Ile Arg Cys Cys Leu His
305                 310

METHODS OF TREATING OR PREVENTING AMYOTROPHIC LATERAL SCLEROSIS

CROSS-REFERENCE TO RELATED APPLICATIONS

This application is a U.S. National Phase of International Application No. PCT/US2019/048985, filed Aug. 30, 2019, which claims priority under 35 U.S.C. § 119 (e) to U.S. Provisional Patent Application No. 62/724,780, filed Aug. 30, 2018. The foregoing applications are incorporated by reference herein.

REFERENCE TO SEQUENCE LISTING SUBMITTED ELECTRONICALLY

This application contains a sequence listing, which is submitted electronically via EFS-Web as an ASCII formatted sequence listing with a file name "SequenceListing" and a creation date of Aug. 30, 2019, and having a size of 2.92 kb. The sequence listing submitted via EFS-Web is part of the specification and is herein incorporated by reference in its entirety.

FIELD OF THE INVENTION

This invention relates generally to methods of treating or preventing amyotrophic lateral sclerosis (ALS) and more specifically to methods of treating, mitigating, ameliorating, or reversing ALS by increasing intracellular activity of aspartoacylase (ASPA) in affected cell populations for the purpose of providing aspartate, a rate-limiting component of the malate-aspartate shuttle that provides affected cells with the ability to utilize cytosolic NADH to fuel mitochondrial oxidative phosphorylation.

BACKGROUND OF THE INVENTION

Amyotrophic lateral sclerosis (ALS), also known as motor neuron disease (MND), or Lou Gehrig's disease, is a disease that causes the death of neurons controlling voluntary muscles. It is characterized by the adult onset of progressive dysfunction and loss of upper motor neurons in the motor cortex and lower motor neurons in the brainstem, spinal cord, and their associated tracts. Patients suffering from ALS or at risk are presented with stiff muscles, muscle twitching, and gradually worsening weakness due to muscles decreasing in size. This results in difficulty speaking, swallowing, and eventually breathing.

No cure for ALS is available, however, FDA has approved two treatments that specifically aim to slow the progression of ALS. Riluzole (Rilutek®), the first FDA approved drug for ALS, may extend life by about two to three months in a finite clinical population presenting with bulbar onset. Edaravone (Radicava®) is another FDA-Approved treatment option for ALS that is administered intravenously. Clinical data suggests that ALS functional rating scale (ALSFRS-R) score improves compared to the control placebo group. However, long term efficacy of Edaravone in patients with ALS is yet to be determined. Non-invasive ventilation may result in both improved quality and length of life, but is strictly palliative in nature. The disease can affect people of any age, but usually starts around the age of 60 and in inherited cases around the age of 50. The average survival from onset to death is 2-4 years. About 10% survive longer than 10 years, with most dying of respiratory failure.

Thus, there remains a pressing unmet need in the art for providing methods and reagents for preventing, treating or reversing ALS.

SUMMARY OF THE INVENTION

This disclosure addresses the need mentioned above in a number of aspects. In one aspect, this disclosure provides a method of treating, ameliorating, or reversing at least one symptom of amyotrophic lateral sclerosis (ALS) in a subject in need thereof. The method comprises administering to the subject a therapeutically effective amount of a composition that increases the level or activity of aspartoacylase (ASPA) in a cell of the subject with the aim of providing substrate for mitochondrial oxidative phosphorylation. In some embodiments, administration composition increases the protein expression level of ASPA in the cell of the subject.

In some embodiments, the composition comprises a gene therapy composition. In some embodiments, the composition may include a nucleic acid encoding ASPA or a functional fragment thereof, having an amino acid sequence at least 75%, 85%, 95%, 99% identical to the sequence of SEQ ID NO: 1.

In some embodiments, the method comprises introducing the nucleic acid to at least one cell of the subject by viral transduction. The composition can be provided a virus or a virus-like particle comprising the nucleic acid. In some embodiments, the nucleic acid is carried on a recombinant adeno-associated virus (rAAV) vector, such as AAV9.

In some embodiments, the method comprises administering the composition to at least a portion of the spinal cord of the subject. In some embodiments, the composition is locally administered to the portion of the spinal cord of the subject.

In some embodiments, the method further comprises administering to the subject a second therapeutic agent. The second therapeutic agent can be administered to the subject before, after, or concurrently with the composition. In some embodiments, the second therapeutic agent is Riluzole (6-(Trifluoromethoxy)-2-benzothiazolamine), or a salt or solvate thereof. In some embodiments, the second therapeutic agent is Edaravone (5-methyl-2-phenyl-4H-pyrazol-3-one), or a salt or solvate thereof. In some embodiments, the composition can be administered by a route selected from oral, parenteral, transdermal, pulmonary, intranasal, buccal, intrathecal, and intravenous.

In some embodiments, the subject is a mammal, such as a human. In some embodiments, at least one cell is in the spinal cord of the subject. In some embodiments, the subject exhibits at least one symptom or mutation associated with ALS. In some embodiments, at least one symptom of ALS is mitochondrial dysfunction. Disruption of mitochondrial structure, dynamics, and bioenergetics has been extensively reported in ALS patients and model systems and has been suggested to be directly involved in disease pathogenesis.

In some embodiments, the administration of the composition will augment substrate for mitochondrial energetic metabolism in the subject. In some embodiments, the administration of the composition increases cell survival in the subject. In some embodiments, the administration of the composition increases motor-neuron survival in the subject. In some embodiments, the administration of the composition extends life expectancy of the subject.

Also within the scope of this disclosure is a kit for increasing a level or activity of ASPA in a cell of a subject. The kit comprises an rAAV vector or a virus-like particle, wherein the virus or the virus-like particle comprises a nucleic acid encoding ASPA or a functional fragment thereof, having an amino acid sequence at least 75%, 85%, 95%, or 99% identical to the sequence of SEQ ID NO: 1. In some embodiments, the nucleic acid encoding ASPA or a fragment thereof, comprises an amino acid sequence of SEQ ID NO: 1. In some embodiments, the rAAV vector is AAV9.

BRIEF DESCRIPTION OF THE DRAWINGS

For the purpose of illustrating the invention, certain embodiments of the invention are depicted in the drawings. However, the invention is not limited to the precise arrangements and instrumentalities of the embodiments depicted in the drawings. For data presented in figures, asterisks denote the following levels of statistical significance: * p≤0.05;  p≤0.01; and * p≤0.001.

FIGS. 4A, 4B, 4C, and 4D (collectively "FIG. 4") show targeting neurons for metabolic gene therapy. An AAV reporter vector expressing green fluorescent protein (GFP) delivered to the hippocampus of an adult mouse. FIG. 4A shows low power confocal microscopy image of GFP-expressing neurons labeled with an antibody to the neuronal nuclear antigen (NeuN). FIG. 4B shows higher magnification of area highlighted by the white arrow in panel A showing individual GFP-positive cell bodies co--labeling with NeuN (FIG. 4C) to give a merged yellow signal, (appearing with a lighter shade in the black and white replication of the image) (FIG. 4D), thereby confirming neuronal tropism in vivo. Suitable AAV can, therefore, be used to deliver any therapeutic gene of interest to neurons in the mammalian brain to the extent it can be properly packaged. Data generated using published methodology (Francis, et al., 2006, Journal of Neuroscience Research 84 (1): 151-169; Francis, et al., 2011, Glia 59 (10): 1435-1446).

FIG. 5 shows targeting synaptic function using gene therapy. Endogenous NAA catabolized by AAV-delivered recombinant ASPA results in increasing substrate for energetic metabolism and an increase in available ATP to support synaptic transmission in neurons.

DETAILED DESCRIPTION OF THE INVENTION

The present invention relates, in one aspect, to the unexpected discovery that increased expression of aminoacylase, such as aspartoacylase (ASPA), in a cell can be used to prevent, treat, or revert one or more symptoms of ALS in a subject in need thereof. In certain embodiments, the compositions and methods of the invention treat or prevent mitochondrial dysfunction in ALS patients. In other embodiments, the compositions and methods of the invention augment substrates for energetic metabolism in ALS-affected cells. In yet other embodiments, the compositions and methods of the invention promote cell survival in ALS patients. In yet other embodiments, the compositions and methods of the invention promote motor neuron survival in ALS patients. In yet other embodiments, ASPA overexpression in the spinal cord extends life expectancy in ALS patients. In yet other embodiments, the treatment utilizes patient-derived motor neurons generated from induced pluripotent stem cells (iPSC). In yet other embodiments, the treatment utilizes stem, progenitor, or patient-derived induced pluripotent stem cells (iPSC) engineered to overexpress ASPA (or a functional fragment thereof) for transplantation into affected areas of the patient nervous system. In yet other embodiments, the expression of ASPA and construction of the delivery construct is done ex vivo. In some embodiments, the expression of ASPA may exhibit reduced degeneration rate of human muscle tissue explant ex vivo as compared to those of ALS subjects. In another embodiment, the treatment is a one-time gene therapy for ALS and related disorders.

While the etiologies of major neurodegenerative diseases are multifactorial and incompletely defined, therapeutic strategies that augment mitochondrial integrity have the potential to delay progressive loss of higher function. For ALS specifically, mitochondrial dysfunction appears to be directly or indirectly linked to all of the postulated mechanisms of toxicity associated with ALS, including excitotoxicity, loss of protein homeostasis and defective axonal transport. Despite differences in postulated pathogenic mechanisms in different in vitro and in vivo models studied, decreased mitochondrial electron transport chain (ETC) activity and ATP levels emerge as a common feature in both familial and sporadic ALS.

Figure 3:
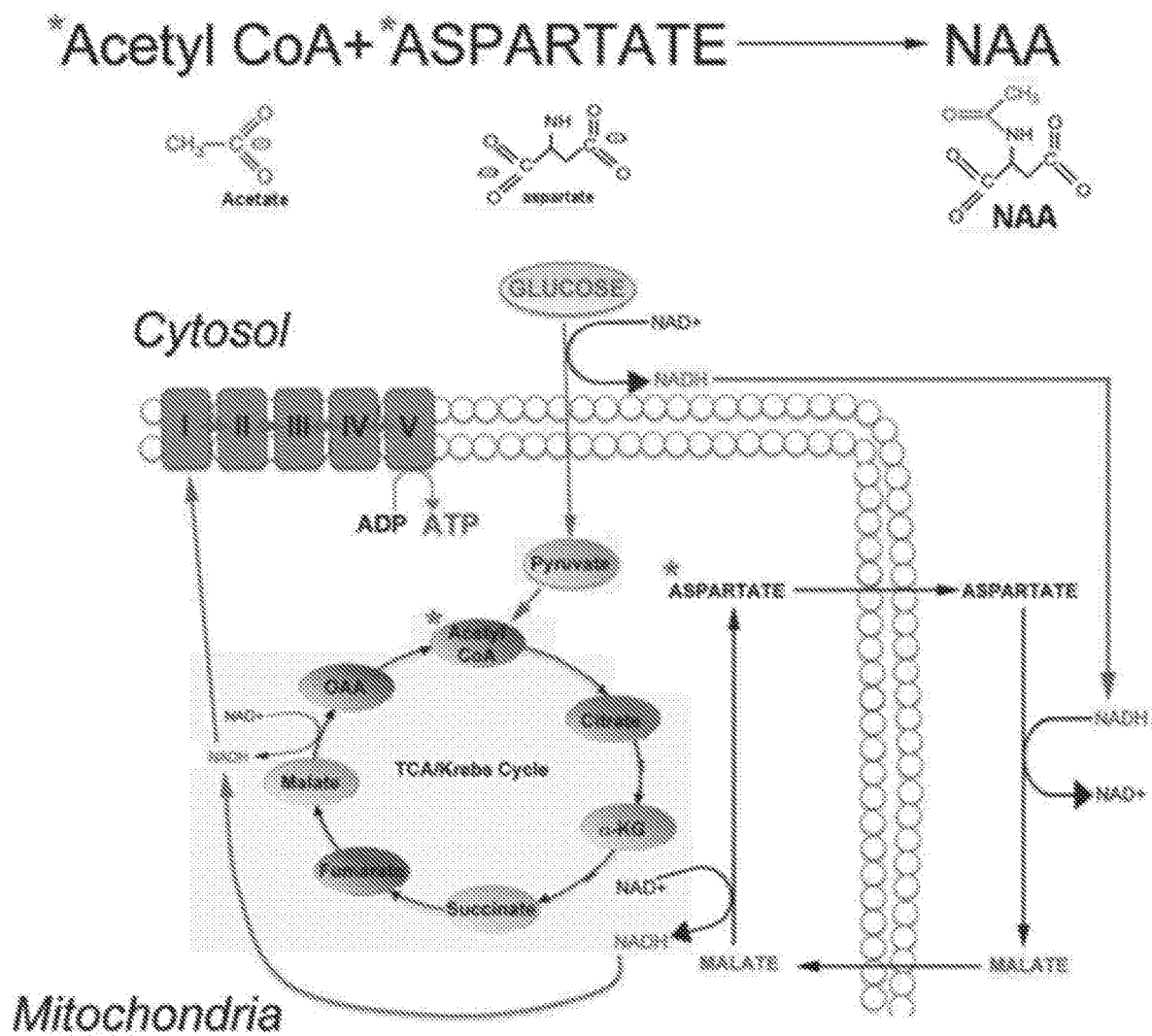
FIG. 3 shows that NAA contains Acetyl coenzyme A (AcCoA), derived from glycolysis, and aspartate, used for the transfer of cytosolic reducing equivalents (NADH) to the inner mitochondrial membrane. Both are substrates for mitochondrial ATP synthesis, with aspartate playing a key role in linking glycolysis to the oxidative phosphorylation by complexes I-V of the electron transport chain. Liberating this substrate in neurons affected by neurodegenerative pathology would, therefore, augment energetic reserves.
Figure 6:
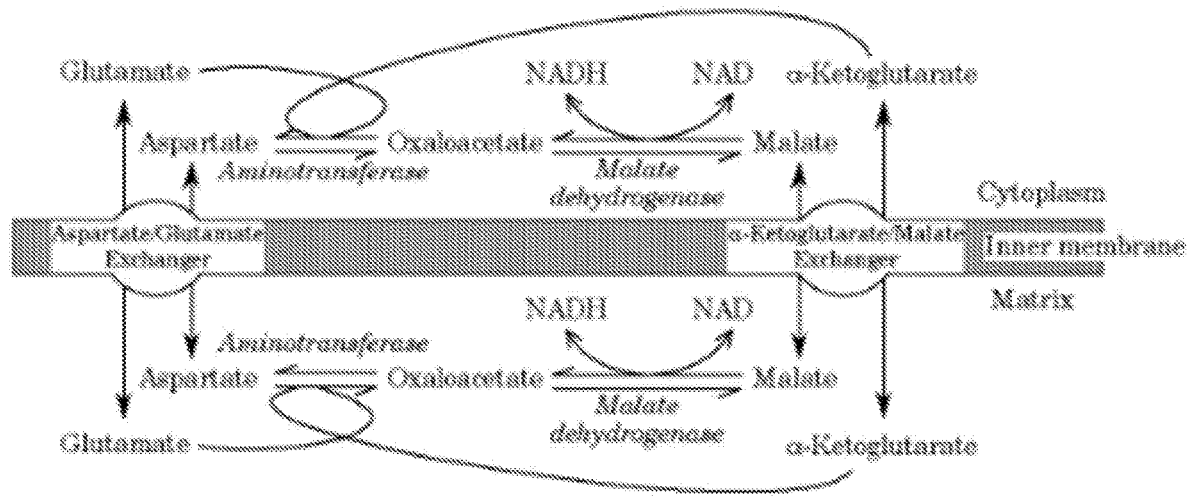
FIG. 6 shows that the reducing power of NADH produced by glycolysis in the cytosol is transported into the inner mitochondrial membrane space by the transferal of a hydrogen ion to aspartate by aspartate aminotransferase to generate malate. Aspartate is moved from the mitochondria to the cytosol in exchange for glutamate. Cytosolic aspartate is then converted to malate, which, carrying the hydrogen ion of cytosolic NADH, can move freely into mitochondria. Once within, malate is converted back to aspartate by malate dehydrogenase, thereby liberating the hydrogen ion to form NADH, which is in turn available to drive mitochondrial oxidative phosphorylation.
Figure 7:
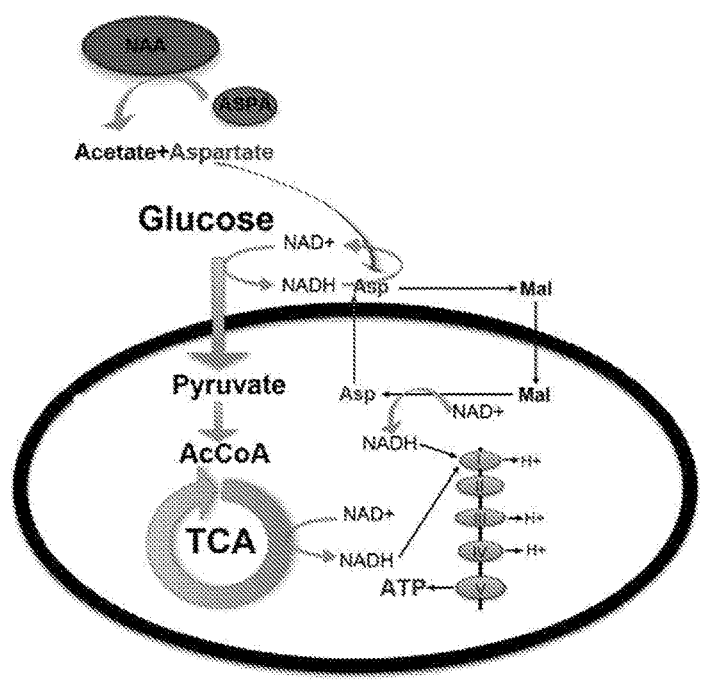
FIG. 7 shows that the free aspartate generated by cleavage of NAA by ASPA is made available to the malate-aspartate shuttle (MAS), which transfers reducing NADH generated by glycolysis into the mitochondria. The NADH thus available drives electron transport chain complexes I-V, culminating in newly synthesized ATP.

The present invention provides a novel gene therapy intervention to supply neurons in ALS with the means to access specific energetic substrate sequestered within the endogenous amino acid derivative, N-acetylaspartate (NAA) (FIG. 3). NAA normally functions to preserve ATP in white matter producing glial cells by uncoupling lipid synthesis from oxidative phosphorylation via the provision of AcCoA by catabolismby the glial hydrolase ASPA. Neurons do not naturally express ASPA, and are therefore incapable of catabolizing NAA. Catabolism of NAA by ASPA yields free acetate (used by glia for the synthesis of AcCoA) and aspartate. Unlike acetate, aspartate in neurons is an integral component of a shuttling mechanism for the transfer of glycolytic reducing equivalents into mitochondria (FIG. 3) as it is a specific substrate for a subunit of the malate-aspartate shuttle (Aralar1). Free acetate is a poor substrate for neuronal energetic metabolism on account of the relative paucity of available biochemical mechanisms capable of processing acetate for energetic metabolism as compared to glial cells, and acetate cannot substitute for glucose in the support of neuron function. Analysis of the flux of radiolabeled acetate provided to the nervous system in fact documents predominant use by glial cells relative to neurons, and acetate is not engaged by Aralar1 in the movement of cytosolic NADH to the mitochondrial ETC, a process that requires the conversion of aspartate to malate in the cytosol. In certain non-limiting embodiments, providing neurons with the ability to catabolize endogenous NAA promotes the preservation of ATP reserves in the face of pathological metabolic abnormalities by providing aspartate for the shuttling of glycolytic reducing equivalents to mitochondria. In at least one embodiment, the present invention is directed to methods of increasing the availability of aspartate for the shuttling of glycolytic reducing equivalents to mitochondria in subjects at risk of developing ALS or suffering from ALS.

Adeno-associated virus (AAV) has emerged as a highly promising and attractive approach to gene delivery with an established clinical safety and efficacy profile, and is extremely efficient at targeting neurons. Advances in AAV vector design and related dosing techniques have enabled widespread gene delivery in the brain and spinal cord and have made AAV well-suited for the treatment of neurogenerative diseases. In at least one embodiment, the present invention employ a AAV serotype for delivering a gene therapy composition that includes a nucleic acid encoding ASPA or a functional fragment thereof, having an amino acid sequence at least 75%, 85%, 95%, 99% identical to the sequence of SEQ ID NO: 1.

This disclosure demonstrated that expressing aminoacylase in motor neurons of the spinal cord in a mouse model of ALS resulted in a long term improvement in motor function, as measured by accelerating rotarod performance in SOD (G93A) transgenic mice. Improved rotarod performance was associated with an increase in detectable spinal cord energetic currency (ATP) and an associated increase in detectable free aspartate. The results indicated the mechanistic relevance of aspartate bioavailability and mitochondrial function to ETC function and the generation of energetic currency in the face of ALS pathology. Specifically, the provision of extra bioavailable aspartate resulting from increased ASPA activity is shown to promote activity of the malate-aspartate shuttle, for which aspartate is rate limiting, for the generation of energetic currency in the form of ATP. In at least one embodiment, the present methodologies increases the bioavailability of aspartate in spinal cord of subjects at risk of developing or suffering from ALS.

In one aspect, this disclosure provides a method of treating, ameliorating, or reversing at least one symptom of amyotrophic lateral sclerosis (ALS) in a subject in need thereof. The method comprises administering to the subject a therapeutically effective amount of a composition that increases a level or activity of aspartoacylase (ASPA) in a cell of the subject. In some embodiments, administration composition increases the protein expression level of ASPA in the cell of the subject. In yet another embodiment, the present methods are directed to increasing NAA catabolism in spinal cord of patients suffering from ALS.

In another embodiment, the subject in need of the present treatment are those that have experienced reduced motor function or are at risk of experiencing motor function disorders with pathologies distinct from cognitive disorders.

In another embodiment, subjects at risk from motor disorders and exhibiting a hypermetabolic state that may show a metabolism ratio of higher than 1, as measured based on the Harris and Benedict equation are candidates for the proposed intervention. In another embodiment, the subject in need may exhibit deficiencies associated with motor neurons of the spinal cord having high metabolic demands on the maintenance of action potential that may not be presented by other diseases not primarily affecting the motor system. In other embodiments, subjects in need may show gradual onset, painless, progressive muscle weakness with tripping, dropping things, abnormal fatigue of the arms and/or legs, slurred speech, muscle cramps and twitches, and/or uncontrollable periods of laughing or crying. In some embodiments, subjects suffering from the weakness of breathing muscles may need permanent ventilatory support to assist with breathing.

In other embodiments, the subject in need of the present treatment may show a mutation that may be determinative in proper diagnosis and development of ALS that include, for example, mutations at the ALS2 (alsin), TBK1 (TANK-binding kinase 1), TUBA4A (tubulin, alpha 4A),, ANG (angiogenin), MATR3 (matrin-3), CHCHD10 (coiled-coil-helix-coiled-coil-helix domain containing 10), NEK1, PFN1 (profilin-1), C21ORF2, MOBP, SCFD1, SETX (senataxin), FUS, TDP43, VCP (valosin-containing protein), or enzymes linked to ALS (ex. KIF5A, inesin family member 5A), and OPTN (optineurin). In another embodiment, the mutation may be at the C9ORF72 gene or cause accumulations of RNA that occurs when the gene is mutated. In yet another embodiment, the subject may first be screened for the presences of such mutations. In yet some embodiments, the screening is for the identification of at least any two or more of the above identified mutations.

In another embodiment, the present invention is directed to administering a therapeutically effective gene therapy in subjects exhibiting a mutation at ALS2, TBK1, TUBA4A, ANG, MATR3, CHCHD10, NEK1, PFN1, C21ORF2, MOBP, SCFD1, SETX, FUS, TDP43, VCP, or OPTN. In yet another aspect, the suitable screened subjects may receive a gene therapy composition comprising a nucleic acid encoding ASPA or a functional fragment thereof, having an amino acid sequence at least 75%, 85%, 95%, or 99% identical to the sequence of SEQ ID NO: 1. In another embodiment, the identified subject may be administered a gene therapy composition comprising SEQ ID No. 1 and AAV-9, and exhibit an increased level of NAA catabolism in his spinal cord. In at least one embodiment, the present invention is directed to administering the disclosed gene therapy to patients exhibiting ALS symptoms that may also show a mutation at the TBK1, TUBA4A, NEK1, C21ORF2, MOBP, SCFD1, FUS, and TDP43 or any combination of such mutations by identifying those patients exhibiting clinical symptoms of ALS and at least one of the above mentioned gene mutations or a gene mutations that occurs in proteins involved in cell axon dynamics and those involved in the clearance machinery of the cell.

In at least one embodiment, the present invention is directed to administering the instant gene therapy to subjects exhibiting a mutation in Cu/Zn superoxide dismutase (SOD1) and increasing the level of NAA catabolism in spinal cord mitochondrial of such patients particularly in those exhibiting at least one clinical symptom of ALS. It has been suggested that only 5-10% have genetic origin (familial-ALS), and only approximately 20% of the familial-ALS cases have mutations in Cu/Zn superoxide dismutase (SOD1). Mutations associated with ALS on SOD1 cause the decrease in the protein stability. These mutations occur all over the protein structure including at the active site, at the β sheet and at the monomer interface. To that end, at least one embodiment of the present invention is directed to methods of administering the present gene therapy to those patients exhibiting the SOD1 mutation. In yet another embodiment, the present invention is directed to methods of identifying subjects with SOD1 mutation, administering to said subjects a composition comprising the nucleic acid encoding ASPA or a fragment thereof, comprises an amino acid sequence of SEQ ID NO:1 and AAV-9 and increasing the level of NAA catabolism in spinal cord of such subjects.

In other embodiments, the subjects in need show upper and lower motor neuron degeneration, with or without progressive brain stem degeneration, a reduction of nerve condition or exhibit muscle weakness subsequent to a electromyography (EMG) study as compared to a healthy patient. Yet such patients do not exhibit a decreased dopamine receptor occupancy, respond to administration of L-Dopa, nor do such subjects exhibit symptoms associated with loss of cognition as in patients suffering from Alzheimer's disease.

In some embodiments, the composition comprises a gene therapy composition. In some embodiments, the composition may include a nucleic acid encoding ASPA or a functional fragment thereof, having an amino acid sequence at least 75%, 85%, 95%, or 99% identical to the sequence of SEQ ID NO: 1. In some embodiments, the nucleic acid encoding ASPA or a fragment thereof, comprises an amino acid sequence of SEQ ID NO: 1.

| SEQ ID | SEQUENCE | INFORMATION |
| --- | --- | --- |
| SEQ ID NO: 1 | MTSCHIAEEHIQK-VAIF | ASPA (UniParcP45381-1) |
| | GGTH-GNELTGVFLVKHW | |
| | LENGAEIQRTG-LEVKPF | |
| | ITNPRAVKKC-TRYIDCD | |
| | LNRIFDLENLGKKM-SED | |
| | LPYEVR-RAQEINHLFGP | |
| | KDSEDSY-DIIFDLHNTT | |
| | SNMGCTLILED-SRNNFL | |
| | IQMFHYIKT-SLAPLPCY | |
| | VYLIEHPSLKYAT-TRSI | |
| | AKYPVGIEVGPQPQGVL | |
| | RADILDQMRK-MIKHALD | |
| | FIHHFNEGKEFPP-CAIE | |
| | VYKIIEKVDY-PRDENGE | |
| | IAAIIHPNLQDQDWKPL | |

-continued

| SEQ ID | SEQUENCE INFORMATION |
|---|---|
| | HPGDPMFLTLDGK-<br>TIPL |
| | GGDCTVYPVFVNEAAYY |
| | EKKEA-<br>FAKTTKLTLNAK |
| | SIRCCLH |

Also within the scope of this disclosure are the variants, mutants, and homologs with significant identity to ASPA. For example, such variants and homologs may have sequences with at least about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, or about 99% sequence identity with the sequences of ASPA described herein.

The terms "variant" and "mutant" when used in reference to a polypeptide refer to an amino acid sequence that differs by one or more amino acids from another, usually related polypeptide. The variant may have "conservative" changes, wherein a substituted amino acid has similar structural or chemical properties. One type of conservative amino acid substitutions refers to the interchangeability of residues having similar side chains. For example, a group of amino acids having aliphatic side chains is glycine, alanine, valine, leucine, and isoleucine; a group of amino acids having aliphatic-hydroxyl side chains is serine and threonine; a group of amino acids having amide-containing side chains is asparagine and glutamine; a group of amino acids having aromatic side chains is phenylalanine, tyrosine, and tryptophan; a group of amino acids having basic side chains is lysine, arginine, and histidine; and a group of amino acids having sulfur-containing side chains is cysteine and methionine. Preferred conservative amino acids substitution groups are: valine-leucine-isoleucine, phenylalanine-tyrosine, lysine-arginine, alanine-valine, and asparagine-glutamine. More rarely, a variant may have "non-conservative" changes (e.g., replacement of a glycine with a tryptophan). Similar minor variations may also include amino acid deletions or insertions (i.e., additions), or both. Guidance in determining which and how many amino acid residues may be substituted, inserted or deleted without abolishing biological activity may be found using computer programs well known in the art, for example, DNAStar software. Variants can be tested in functional assays. Preferred variants have less than 10%, and preferably less than 5%, and still more preferably less than 2% changes (whether substitutions, deletions, and so on).

The term "homolog" or "homologous", when used in reference to a polypeptide, refers to a high degree of sequence identity between two polypeptides, or to a high degree of similarity between the three-dimensional structures or to a high degree of similarity between the active site and the mechanism of action. In a preferred embodiment, a homolog has a greater than 60% sequence identity, and more preferably greater than 75% sequence identity, and still more preferably greater than 90% sequence identity, with a reference sequence. The term "substantial identity," as applied to polypeptides, means that two peptide sequences, when optimally aligned, such as by the programs GAP or BEST-FIT using default gap weights, share at least 75% sequence identity.

As used herein, to express a gene means that the cell produces either the full-length polypeptide encoded by the gene or a functional fragment of the full-length polypeptide. The term "functional," when used in conjunction with "fragment," refers to a polypeptide which possesses a biological activity that is substantially similar to a biological activity of the entity or molecule of which it is a fragment thereof. By "substantially similar" in this context is meant that at least 25%, at least 35%, at least 50% of the relevant or desired biological activity of a corresponding wild-type peptide is retained. For example, a functional fragment of polypeptide retains enzymatic activity that is substantially similar to the enzymatic activity of the full-length polypeptide encoded by a gene expressed in the cell.

"Overexpression" refers to the production of a gene product in cells/organisms that exceeds levels of production in normal or non-transformed cells/organisms. For example, it may refer to an elevated level (e.g., aberrant level) of mRNAs encoding for a protein(s) (e.g., an ASPA protein or homolog thereof), and/or to elevated levels of protein(s) (e.g. ASPA) in cells as compared to similar corresponding unmodified cells/organisms expressing basal levels of mRNAs (e.g., those encoding ASPA protein) or having basal levels of proteins. In particular embodiments, ASPA, or homologs thereof, may be overexpressed by at least 1.5-fold, 2-fold, 3-fold, 4-fold, 5-fold, 6-fold, 8-fold, 10-fold, 12-fold, 15-fold or more in cells/organisms engineered to exhibit increased mRNA, protein, and/or activity of ASPA.

The expression of ASPA can be induced by introducing one or more expression vectors carrying nucleic acids encoding one or more of ASPA polypeptides or fragments thereof. The polypeptide or fragment thereof can be inserted into the proper site of the vector (e.g., operably linked to a promoter). The expression vector is introduced into a selected host cell for amplification and/or polypeptide expression, by well-known methods such as transfection, transduction, infection, electroporation, microinjection, lipofection or the DEAE-dextran method or other known techniques. These methods and other suitable methods are well known to the skilled artisan.

A wide variety of vectors can be used for the expression of the ASPA protein. The ability of certain viruses to infect cells or enter cells via receptor-mediated endocytosis, and to integrate into a host cell genome and express viral genes stably and efficiently have made them attractive candidates for the transfer of foreign nucleic acids into cells. Accordingly, in certain embodiments, a viral vector is used to introduce a nucleotide sequence encoding an ASPA protein or fragment thereof into a host cell for expression. The viral vector may comprise a nucleotide sequence encoding an ASPA protein or fragment thereof operably linked to one or more control sequences, for example, a promoter. Alternatively, the viral vector may not contain a control sequence and will instead rely on a control sequence within the host cell to drive expression of the ASPA protein or fragment thereof. Non-limiting examples of viral vectors that may be used to deliver a nucleic acid include adenoviral vectors, AAV vectors, and retroviral vectors.

For example, an adeno-associated virus (AAV) can be used to introduce a nucleotide sequence encoding ASPA protein or fragment thereof into a host cell for expression. AAV systems have been described previously and are generally well known in the art (Kelleher and Vos, Biotechniques, 17 (6): 1110-7, 1994; Cotten et al., Proc Natl Acad Sci USA, 89 (13): 6094-6098, 1992; Curiel, Nat Immun, 13 (2-3): 141-64, 1994; Muzyczka, Curr Top Microbiol Immunol, 158:97-129, 1992). Details concerning the generation and use of rAAV vectors are described, for example, in U.S. Pat. Nos. 5,139,941 and 4,797,368, each incorporated herein by reference in its entirety for all purposes.

In some embodiments, a retroviral expression vector can be used to introduce a nucleotide sequence encoding an ASPA protein or fragment thereof into a host cell for expression. These systems have been described previously and are generally well known in the art (Nicolas and Rubinstein, In: Vectors: A survey of molecular cloning vectors and their uses, Rodriguez and Denhardt, eds., Stoneham: Butterworth, pp. 494-513, 1988; Temin, In: Gene Transfer, Kucherlapati (ed.), New York: Plenum Press, pp. 149-188, 1986). Examples of vectors for eukaryotic expression in mammalian cells include AD5, pSVL, pCMV, pRc/RSV, pcDNA3, pBPV, etc., and vectors derived from viral systems such as vaccinia virus, adeno-associated viruses, herpes viruses, retroviruses, etc., using promoters such as CMV, SV40, EF-1, UbC, RSV, ADV, BPV, and β-actin.

Combinations of retroviruses and an appropriate packaging line may also find use, where the capsid proteins will be functional for infecting the target cells. Usually, the cells and virus will be incubated for at least about 24 hours in the culture medium. The cells are then allowed to grow in the culture medium for short intervals in some applications, e.g., 24-73 hours, or for at least two weeks, and may be allowed to grow for five weeks or more, before analysis. Commonly used retroviral vectors are "defective," i.e., unable to produce viral proteins required for productive infection. Replication of the vector requires growth in the packaging cell line. The host cell specificity of the retrovirus is determined by the envelope protein, env (p120). The envelope protein is provided by the packaging cell line. Envelope proteins are of at least three types, ecotropic, amphotropic and xenotropic. Retroviruses packaged with ecotropic envelope protein, e.g., MMLV, are capable of infecting most murine and rat cell types. Ecotropic packaging cell lines include BOSC23. Retroviruses bearing amphotropic envelope protein, e.g., 4070A, are capable of infecting most mammalian cell types, including human, dog, and mouse. Amphotropic packaging cell lines include PA12 and PA317. Retroviruses packaged with xenotropic envelope protein, e.g., AKR env, are capable of infecting most mammalian cell types, except murine cells. The vectors may include genes that must later be removed, e.g., using a recombinase system such as Cre/Lox, or the cells that express them destroyed, e.g., by including genes that allow selective toxicity such as herpesvirus TK, bcl-xs, etc. Suitable inducible promoters are activated in a desired target cell type, either the transfected cell or progeny thereof.

In some embodiments, genome-editing techniques, such as CRISPR/Cas9 systems, designer zinc fingers, transcription activator-like effectors (TALEs), or homing meganucleases are available to induce expression of the described ASPA protein in a cell. In general, "CRISPR/Cas9 system" refers collectively to transcripts and other elements involved in the expression of or directing the activity of CRISPR-associated ("Cas") genes, including sequences encoding a Cas gene, a tracr (trans-activating CRISPR) sequence (e.g. tracrRNA or an active partial tracrRNA), a tracr-mate sequence (encompassing a "direct repeat" and a tracrRNA-processed partial direct repeat in the context of an endogenous CRISPR system), a guide sequence (also referred to as a "spacer" in the context of an endogenous CRISPR system), or other sequences and transcripts from a CRISPR locus. One or more elements of a CRISPR system may be derived from a type I, type II, or type III CRISPR system. Alternatively, one or more elements of a CRISPR system may be derived from a particular organism comprising an endogenous CRISPR system, such as *Streptococcus pyogenes*. In general, a CRISPR system is characterized by elements that promote the formation of a CRISPR complex at the site of a target sequence (also referred to as a protospacer in the context of an endogenous CRISPR system). In some embodiments, genome-editing techniques, such as CRISPR/Cas9 systems, designer zinc fingers, transcription activator-like effectors (TALEs), or homing meganucleases are available to induce expression of the described ASPA protein in a cell that result in increased substrate for mitochondrial oxidative phosphorylation.

In some embodiments, the method comprises introducing the nucleic acid to the at least one cell of the subject by viral transduction. The composition can be provided a virus or a virus-like particle comprising the nucleic acid. In some embodiments, the nucleic acid is carried on a recombinant adeno-associated virus (rAAV) vector, such as AAV9.

In some embodiments, the rAAV is artificially produced from its natural environment (e.g. from a host cell, a tissue or a subject). For example isolated AAV can be produced using recombinant methods. Such rAAV preferably has tissue specific targeting abilities such that the AAV transgene is specifically delivered to one or more predetermined tissues. AAV capsid are an important factor in determining their tissue specific targeting ability. To that end, in at least one embodiment, one can select a recombinant AAV with capsids suitable for the spinal tissue. Methods for obtaining recombinant AAV with the desired capsid protein have been described for example in Patent Application Publication No. 2003/0138772 which is incorporated herein by reference in its entirety.

In another aspect, the present invention provides a method of treating, ameliorating, or reversing at least one symptom of ALS in a subject in need thereof by identifying a patient in need of an increase in intracellular aspartate level comprising administering to the subject a therapeutically effective amount of a composition that increases a level or activity of aspartoacylase (ASPA) in at least one cell of the subject, wherein the composition includes a nucleic acid encoding ASPA or a functional fragment thereof, having an amino acid sequence at least 75% identical to the sequence of SEQ ID NO: 1.

In some embodiments, the method comprises administering the composition to at least a portion of the spinal cord of the subject. In some embodiments, the composition is locally administered to the portion of the spinal cord of the subject. In some embodiments, the composition may be administered to the brain stem for use in treating ALS. In another embodiment, the compositions of the present invention for use in treating ALS may be combined with a second pharmaceutically compounds to treat upper and lower motor neuron degeneration, decrease progression or improve upper and lower motor function. In some embodiments, the second pharmaceutical compound may be R (+)-N-propargyl-1-aminoindan in combination with 2-amino-6-trifluoromethoxy benzothiazole or their respective pharmaceutically acceptable salts thereof including, but are not limited to, mesylate salts, maleate, fumarate, tartrate, hydrochloride, hydrobromide, esylate, p-toluenesulfonate, benzoate, acetate, phosphate and sulfate.

Gene Therapy:

The nucleic acids encoding the protein(s) useful within the invention may be used in gene therapy protocols for the treatment of the diseases or disorders contemplated herein, such as diseases characterized by energetic deficit in cells of the central and peripheral nervous system that support motor function, including upper and lower motor neurons of the brain and spinal cord. In certain embodiments, the diseases or disorders comprise amyotrophic lateral sclerosis (superoxide dismutase aggregation). The improved construct encoding the protein(s) can be inserted into the appropriate gene therapy vector and administered to a patient to treat or prevent the diseases or disorder of interest.

Vectors, such as viral vectors, have been used in the prior art to introduce genes into a wide variety of different target cells. Typically the vectors are exposed to the target cells so that transformation can take place in a sufficient proportion of the cells to provide a useful therapeutic or prophylactic effect from the expression of the desired polypeptide (e.g., a receptor). The transfected nucleic acid may be permanently incorporated into the genome of each of the targeted cells, providing long lasting effect, or alternatively the treatment may have to be repeated periodically.

A variety of vectors, both viral vectors and plasmid vectors are known in the art (see for example U.S. Pat. No. 5,252,479 and WO 93/07282). In particular, a number of viruses have been used as gene transfer vectors, including papovaviruses, such as SV40, vaccinia virus, herpes viruses including HSV and EBV, and retroviruses. Many gene therapy protocols in the prior art have employed disabled murine retroviruses. Several recently issued patents are directed to methods and compositions for performing gene therapy (see for example U.S. Pat. Nos. 6,168,916; 6,135, 976; 5,965,541 and 6,129,705). Each of the foregoing patents is incorporated by reference in its entirety herein.

AAV-Mediated Gene Therapy:

AAV, a parvovirus belonging to the genus Dependovirus, has several features that make it particularly well suited for gene therapy applications. For example, AAV can infect a wide range of host cells, including non-dividing cells. Furthermore, AAV can infect cells from a variety of species. Importantly, AAV has not been associated with any human or animal disease, and does not appear to alter the physiological properties of the host cell upon integration.

Finally, AAV is stable at a wide range of physical and chemical conditions, which lends itself to production, storage, and transportation requirements. The AAV genome, a linear, single-stranded DNA molecule containing approximately 4,700 nucleotides (the AAV-2 genome consists of 4,681 nucleotides, the AAV-4 genome 4,767), generally comprises an internal non-repeating segment flanked on each end by inverted terminal repeats (ITRs). The ITRs are approximately 145 nucleotides in length (AAV-1 has ITRs of 143 nucleotides) and have multiple functions, including serving as origins of replication, and as packaging signals for the viral genome. The internal non-repeated portion of the genome includes two large open reading frames (ORFs), known as the AAV replication (rep) and capsid (cap) regions. These ORFs encode replication and capsid gene products, which allow for the replication, assembly, and packaging of a complete AAV virion. More specifically, a family of at least four viral proteins are expressed from the AAV rep region: Rep 78, Rep 68, Rep 52, and Rep 40, all of which are named for their apparent molecular weights. The AAV cap region encodes at least three proteins: VP1, VP2, and VP3. AAV is a helper-dependent virus, that is, it requires co-infection with a helper virus (e.g., adenovirus, herpesvirus, or vaccinia virus) in order to form functionally complete AAV virions. In the absence of co-infection with a helper virus, AAV establishes a latent state in which the viral genome inserts into a host cell chromosome or exists in an episomal form, but infectious virions are not produced.

Subsequent infection by a helper virus "rescues" the integrated genome, allowing it to be replicated and packaged into viral capsids, thereby reconstituting the infectious virion. While AAV can infect cells from different species, the helper virus must be of the same species as the host cell. Thus, for example, human AAV will replicate in canine cells that have been co-infected with a canine adenovirus.

To produce infectious recombinant AAV (rAAV) containing a heterologous nucleic acid sequence, a suitable host cell line can be transfected with an AAV vector containing the heterologous nucleic acid sequence, but lacking the AAV helper function genes, rep and cap. The AAV-helper function genes can then be provided on a separate vector. Also, only the helper virus genes necessary for AAV production (i.e., the accessory function genes) can be provided on a vector, rather than providing a replication-competent helper virus (such as adenovirus, herpesvirus, or vaccinia).

Collectively, the AAV helper function genes (i.e., rep and cap) and accessory function genes can be provided on one or more vectors. Helper and accessory function gene products can then be expressed in the host cell where they will act in trans on rAAV vectors containing the heterologous nucleic acid sequence. The rAAV vector containing the heterologous nucleic acid sequence will then be replicated and packaged as though it were a wild-type (wt) AAV genome, forming a recombinant virion. When a patient's cells are infected with the resulting rAAV virions, the heterologous nucleic acid sequence enters and is expressed in the patient's cells. Because the patient's cells lack the rep and cap genes, as well as the accessory function genes, the rAAV cannot further replicate and package their genomes. Moreover, without a source of rep and cap genes, wtAAV cannot be formed in the patient's cells.

In one aspect of the present invention, suitable AAV serotypes or serotype variant include AAV1 through AAV12 such as AAV2, AAV2.5, AAV5, AAV6, AV6.2, AAV7, AAV8, AAV9, AAV10, AAV11, and AAV12 as well as rationally engineered capsid variants of these of AAV-based vectors, such as AAV9HR.

AAV-1 through AAV-11 have been described in the art (Mori, et al., 2004, Virology 330 (2): 375-83). AAV-2 is the most prevalent serotype in human populations; one study estimated that at least 80% of the general population has been infected with wt AAV-2 (Berns and Linden, 1995, Bioessays 17:237-245). AAV-3 and AAV-5 are also prevalent in human populations, with infection rates of up to 60% (Georg-Fries, et al., 1984, Virology 134:64-71). AAV-1 and AAV-4 are simian isolates, although both serotypes can transduce human cells (Chiorini, et al., 1997, J Virol 71:6823-6833; Chou, et al., 2000, Mol Ther 2:619623). Of the six known serotypes, AAV-2 is the best characterized. For instance, AAV-2 has been used in a broad array of in vivo transduction experiments, and has been shown to transduce many different tissue types including: mouse (U.S. Pat. Nos. 5,858,351; 6,093,392), dog muscle; mouse liver (Couto, et al., 1999, Proc. Natl. Acad. Sci. USA 96:12725-12730; Couto, et al., 1997, J. Virol. 73:5438-5447; Nakai, et al., 1999, J. Virol. 73:5438-5447; and, Snyder, et al., 1997, Nat. Genet. 16:270-276); mouse heart (Su, et al., 2000, Proc. Natl. Acad. Sci. USA 97:13801-13806); rabbit lung (Flotte, et al., 1993, Proc. Natl. Acad. Sci. USA 90:10613-10617); and rodent photoreceptors (Flannery et al., 1997, Proc. Natl. Acad. Sci. USA 94:6916-6921).

The broad tissue tropism of AAV-2 may be exploited to deliver tissue-specific transgenes. For example, AAV-2 vectors have been used to deliver the following genes: the cystic fibrosis transmembrane conductance regulator gene to rabbit lungs (Flotte, et al., 1993, Proc. Natl. Acad. Sci. USA 90:10613-10617); Factor NIII gene (Burton, et al., 1999, Proc. Natl. Acad. Sci. USA 96:12725-12730) and Factor IX gene (Nakai, et al., 1999, J. Virol. 73:5438-5447; Snyder, et al., 1997, Nat. Genet. 16:270-276; U.S. Pat. No. 6,093,392) to mouse liver, dog, and mouse muscle (U.S. Pat. No. 6,093,392); erythropoietin gene to mouse muscle (U.S. Pat. Nos. 5,858,351); vascular endothelial growth factor (VEGF) gene to mouse heart (Su, et al., 2000, Proc. Natl. Acad. Sci. USA 97:13801-13806); and aromatic 1-amino acid decarboxylase gene to monkey neurons. Expression of certain rAAV-delivered transgenes has therapeutic effect in laboratory animals; for example, expression of Factor IX was reported to have restored phenotypic normalcy in dog models of hemophilia B (U.S. Pat. No. 6,093,392). Moreover, expression of rAAV-delivered NEGF to mouse myocardium resulted in neovascular formation (Su, et al., 2000, Proc. Natl. Acad. Sci. USA 97:13801-13806), and expression of rAAV-delivered AADC to the brains of parkinsonian monkeys resulted in the restoration of dopaminergic function.

Delivery of a protein of interest to the cells of a mammal is accomplished by first generating an AAV vector comprising DNA encoding the protein of interest and then administering the vector to the mammal. Thus, the invention should be construed to include AAV vectors comprising DNA encoding the protein of interest. Once armed with the present invention, the generation of AAV vectors comprising DNA encoding these proteins will be apparent to the skilled artisan.

In certain embodiments, the rAAV vector of the invention comprises several essential DNA elements. In certain embodiments, these DNA elements include at least two copies of an AAV ITR sequence, a promoter/enhancer element, a transcription termination signal, any necessary 5' or 3' untranslated regions which flank DNA encoding the protein of interest or a biologically active fragment thereof. The rAAV vector of the invention may also include a portion of an intron of the protein on interest. Also, optionally, the rAAV vector of the invention comprises DNA encoding a mutated protein of interest.

In certain embodiments, the vector comprises a promoter/regulatory sequence that comprises a promiscuous promoter which is capable of driving expression of a heterologous gene to high levels in many different cell types. Such promoters include, but are not limited to the cytomegalovirus (CMV) immediate early promoter/enhancer sequences, the Rous sarcoma virus promoter/enhancer sequences and the like. In certain embodiments, the promoter/regulatory sequence in the rAAV vector of the invention is the CMV immediate early promoter/enhancer. However, the promoter sequence used to drive expression of the heterologous gene may also be an inducible promoter, for example, but not limited to, a steroid inducible promoter, or may be a tissue-specific promoter, such as, but not limited to, the skeletal-actin promoter which is muscle tissue-specific and the muscle creatine kinase promoter/enhancer, and the like.

In certain embodiments, the rAAV vector of the invention comprises a transcription termination signal. While any transcription termination signal may be included in the vector of the invention, in certain embodiments, the transcription termination signal is the SV40 transcription termination signal.

In certain embodiments, the rAAV vector of the invention comprises isolated DNA encoding the protein of interest, or a biologically active fragment of the protein of interest. The invention should be construed to include any mammalian sequence of the protein of interest which is either known or unknown. Thus, the invention should be construed to include genes from mammals other than humans, which protein functions in a substantially similar manner to the human protein. Preferably, the nucleotide sequence comprising the gene encoding the protein of interest is about 50% homologous, more preferably about 70% homologous, even more preferably about 80% or 85% homologous and most preferably about 90%, 95%, or 99% homologous to the gene encoding the protein of interest.

Further, the invention should be construed to include naturally occurring variants or recombinantly derived mutants of wild type protein sequences, which variants or mutants render the protein encoded thereby either as therapeutically effective as the full-length protein, or even more therapeutically effective than full-length protein in the gene therapy methods of the invention.

The invention should also be construed to include DNA encoding variants which retain the protein's biological activity. Such variants include proteins or polypeptides which have been or may be modified using recombinant DNA technology, such that the protein or polypeptide possesses additional properties which enhance its suitability for use in the methods described herein, for example, but not limited to, variants conferring enhanced stability on the protein in plasma and enhanced specific activity of the protein. Analogs can differ from naturally occurring proteins or peptides by conservative amino acid sequence differences or by modifications which do not affect sequence, or by both. For example, conservative amino acid changes may be made, which although they alter the primary sequence of the protein or peptide, do not normally alter its function.

The invention is not limited to the specific rAAV vector exemplified in the experimental examples; rather, the invention should be construed to include any suitable AAV vector, including, but not limited to, vectors based on AAV-1, AAV2.5, AAV-3, AAV-4, AAV-5, AAV-6, AAV-8, AAV-9, and the like.

Also included in the invention is a method of treating a mammal having a disease or disorder in an amount effective to provide a therapeutic effect. The method comprises administering to the mammal an rAAV vector comprising the protein of interest. Preferably, the mammal is a human.

Typically, the number of viral vector genomes/mammal which are administered in a single injection ranges from about $1 \times 10^8$ to about $5 \times 10^{16}$. Preferably, the number of viral vector genomes/mammal which are administered in a single injection is from about $1 \times 10^{10}$ to about $1 \times 10^{15}$; more preferably, the number of viral vector genomes/mammal which are administered in a single injection is from about $5 \times 10^{10}$ to about $5 \times 10^{15}$; and, most preferably, the number of viral vector genomes which are administered to the mammal in a single injection is from about $5 \times 10^{11}$ to about $5 \times 10^{14}$.

When the method of the invention comprises multiple site simultaneous injections, or several multiple site injections comprising injections into different sites over a period of several hours (for example, from about less than one hour to about two or three hours) the total number of viral vector genomes administered may be identical, or a fraction thereof or a multiple thereof, to that recited in the single site injection method.

For administration of the rAAV vector of the invention in a single site injection, in certain embodiments, a composition comprising the virus is injected directly into the brain of the subject. For administration to the mammal, the rAAV vector may be suspended in a pharmaceutically acceptable carrier, for example, HEPES buffered saline at a pH of about 7.8. Other useful pharmaceutically acceptable carriers include, but are not limited to, glycerol, water, saline, ethanol and other pharmaceutically acceptable salt solutions such as phosphates and salts of organic acids. Examples of these and other pharmaceutically acceptable carriers are described in Remington's Pharmaceutical Sciences (1991, Mack Publication Co., New Jersey).

The rAAV vector of the invention may also be provided in the form of a kit, the kit comprising, for example, a freeze-dried preparation of vector in a dried salts formulation, sterile water for suspension of the vector/salts composition and instructions for suspension of the vector and administration of the same to the mammal.

Combination Therapies:

The compositions identified using the methods described here are useful in the methods of the invention in combination with one or more additional compounds or compositions useful for treating the diseases or alleviating the symptoms of the disorders contemplated herein. These additional compounds may comprise compounds identified herein or compounds, e.g., commercially available compounds, known to treat, prevent, or reduce the symptoms of the diseases or disorders contemplated herein.

Non-limiting examples of additional compounds include Riluzole, Edaravone or a salt or solvate thereof respectively or a combination thereof. Other compounds including selective serotonin reuptake inhibitors (SSRIs) such as fluoxetine, alone or in combination with dextromethorphan, and/or quinidine may also be used in conjunctions of the present gene therapy regimen. Accordingly, a synergistic effect may be calculated, for example, using suitable methods such as, for example, the Sigmoid-Emax equation (Holford & Scheiner, 19981, Clin. Pharmacokinet. 6:429-453), the equation of Loewe additivity (Loewe & Muischnek, 1926, Arch. Exp. Pathol Pharmacol. 114:313-326) and the median-effect equation (Chou & Talalay, 1984, Adv. Enzyme Regul. 22:27-55). Each equation referred to above may be applied to experimental data to generate a corresponding graph to aid in assessing the effects of the drug combination. The corresponding graphs associated with the equations referred to above are the concentration-effect curve, isobologram curve, and combination index curve, respectively.

Pharmaceutical Compositions and Formulations:

The invention also encompasses the use of a pharmaceutical composition of the invention to practice the methods of the invention. Such a pharmaceutical composition may be provided in a form suitable for administration to a subject and may be comprise one or more pharmaceutically acceptable carriers, one or more additional ingredients, or some combination of these. The at least one composition of the invention may comprise a physiologically acceptable salt, such as a compound contemplated within the invention in combination with a physiologically acceptable cation or anion, as is well known in the art.

In an embodiment, the pharmaceutical compositions useful for practicing the method of the invention may be administered to deliver a dose of between 1 ng/kg/day and 100 mg/kg/day. In another embodiment, the pharmaceutical compositions useful for practicing the invention may be administered to deliver a dose of between 1 ng/kg/day and 500 mg/kg/day.

The relative amounts of the active ingredient, the pharmaceutically acceptable carrier, and any additional ingredients in a pharmaceutical composition of the invention will vary, depending upon the identity, size, and condition of the subject treated and further depending upon the route by which the composition is to be administered. By way of example, the composition may comprise between 0.1% and 100% (w/w) active ingredient.

Pharmaceutical compositions that are useful in the methods of the invention may be suitably developed for inhalational, oral, rectal, vaginal, parenteral, topical, transdermal, pulmonary, intranasal, buccal, ophthalmic, intrathecal, intracranial, intravenous or another route of administration. Other contemplated formulations include projected nanoparticles, liposomal preparations, resealed erythrocytes containing the active ingredient, and immunologically-based formulations. The route(s) of administration will be readily apparent to the skilled artisan and will depend upon any number of factors including the type and severity of the disease being treated, the type and age of the veterinary or human patient being treated, and the like. The formulations of the pharmaceutical compositions described herein may be prepared by any method known or hereafter developed in the art of pharmacology. In general, such preparatory methods include the step of bringing the active ingredient into association with a carrier or one or more other accessory ingredients, and then, if necessary or desirable, shaping or packaging the product into a desired single- or multi-dose unit.

As used herein, a "unit dose" is a discrete amount of the pharmaceutical composition comprising a predetermined amount of the active ingredient. The amount of the active ingredient is generally equal to the dosage of the active ingredient that would be administered to a subject or a convenient fraction of such a dosage such as, for example, one-half or one-third of such a dosage. The unit dosage form may be for a single daily dose or one of multiple daily doses (e.g., about 1 to 4 or more times per day). When multiple daily doses are used, the unit dosage form may be the same or different for each dose.

Although the descriptions of pharmaceutical compositions provided herein are principally directed to pharmaceutical compositions that are suitable for ethical administration to humans, it will be understood by the skilled artisan that such compositions are generally suitable for administration to animals of all sorts. Modification of pharmaceutical compositions suitable for administration to humans in order to render the compositions suitable for administration to various animals is well understood, and the ordinarily skilled veterinary pharmacologist can design and perform such modification with merely ordinary, if any, experimentation. Subjects to which administration of the pharmaceutical compositions of the invention is contemplated include, but are not limited to, humans and other primates, mammals including commercially relevant mammals such as cattle, pigs, horses, sheep, cats, and dogs.

In one embodiment, the compositions of the invention are formulated using one or more pharmaceutically acceptable excipients or carriers. In other embodiment, the pharmaceutical compositions of the invention comprise a therapeutically effective amount of at least one composition of the invention and a pharmaceutically acceptable carrier. Pharmaceutically acceptable carriers, which are useful, include, but are not limited to, glycerol, water, saline, ethanol and other pharmaceutically acceptable salt solutions such as phosphates and salts of organic acids. Examples of these and other pharmaceutically acceptable carriers are described in Remington's Pharmaceutical Sciences (1991, Mack Publication Co., New Jersey)

The carrier may be a solvent or dispersion medium containing, for example, water, ethanol, polyol (for example, glycerol, propylene glycol, and liquid polyethylene glycol, and the like), suitable mixtures thereof, and vegetable oils. The proper fluidity may be maintained, for example, by the use of a coating such as lecithin, by the maintenance of the required particle size in the case of dispersion and by the use of surfactants. Prevention of the action of microorganisms may be achieved by various antibacterial and antifungal agents, for example, parabens, chlorobutanol, phenol, ascorbic acid, thimerosal, and the like. In many cases, it will be preferable to include isotonic agents, for example, sugars, sodium chloride, or polyalcohols such as mannitol and sorbitol, in the composition. Prolonged absorption of the injectable compositions may be brought about by including in the composition an agent which delays absorption, for example, aluminum monostearate or gelatin.

Formulations may be employed in admixtures with conventional excipients, i.e., pharmaceutically acceptable organic or inorganic carrier substances suitable for oral, parenteral, intrathechal, nasal, intravenous, subcutaneous, enteral, or any other suitable mode of administration, known to the art. The pharmaceutical preparations may be sterilized and if desired mixed with auxiliary agents, e.g., lubricants, preservatives, stabilizers, wetting agents, emulsifiers, salts for influencing osmotic pressure buffers, coloring, flavoring and/or aromatic substances and the like. They may also be combined where desired with other active agents, e.g., other analgesic agents.

As used herein, "additional ingredients" include, but are not limited to, one or more of the following: excipients; surface-active agents; dispersing agents; inert diluents; granulating and disintegrating agents; binding agents; lubricating agents; sweetening agents; flavoring agents; coloring agents; preservatives; physiologically degradable compositions such as gelatin; aqueous vehicles and solvents; oily vehicles and solvents; suspending agents; dispersing or wetting agents; emulsifying agents, demulcents; buffers; salts; thickening agents; fillers; emulsifying agents; antioxidants; antibiotics; antifungal agents; stabilizing agents; and pharmaceutically acceptable polymeric or hydrophobic materials. Other "additional ingredients" that may be included in the pharmaceutical compositions of the invention are known in the art and described, for example in Genaro, ed. (1985, Remington's Pharmaceutical Sciences, Mack Publishing Co., Easton, PA), which is incorporated herein by reference.

The compositions of the invention may comprise a preservative from about 0.005% to 2.0% by total weight of the composition. The preservative is used to prevent spoilage in the case of exposure to contaminants in the environment. Examples of preservatives useful in accordance with the invention included but are not limited to those selected from the group consisting of benzyl alcohol, sorbic acid, parabens, imidurea, and combinations thereof. An example of preservative is a combination of about 0.5% to 2.0% benzyl alcohol and 0.05% to 0.5% sorbic acid.

The compositions preferably include an antioxidant and a chelating agent which inhibit the degradation of the compound. Preferred antioxidants for some compounds are BHT, BHA, alpha-tocopherol and ascorbic acid in the preferred range of about 0.01% to 0.3% and more preferably BHT in the range of 0.03% to 0.1% by weight by total weight of the composition. Preferably, the chelating agent is present in an amount of from 0.01% to 0.5% by weight by total weight of the composition. Particularly preferred chelating agents include edetate salts (e.g. disodium edetate) and citric acid in the weight range of about 0.01% to 0. % and more preferably in the range of 0.02% to 0.10% by weight by total weight of the composition. The chelating agent is useful for chelating metal ions in the composition which may be detrimental to the shelf life of the formulation. While BHT and disodium edetate are the particularly preferred antioxidant and chelating agent respectively for some compounds, other suitable and equivalent antioxidants and chelating agents may be substituted therefore as would be known to those skilled in the art.

Liquid suspensions may be prepared using conventional methods to achieve suspension of the active ingredient in an aqueous or oily vehicle. Aqueous vehicles include, for example, water, and isotonic saline. Oily vehicles include, for example, almond oil, oily esters, ethyl alcohol, vegetable oils such as *arachis*, olive, sesame, or coconut oil, fractionated vegetable oils, and mineral oils such as liquid paraffin. Liquid suspensions may further comprise one or more additional ingredients including, but not limited to, suspending agents, dispersing or wetting agents, emulsifying agents, demulcents, preservatives, buffers, salts, flavorings, coloring agents, and sweetening agents. Oily suspensions may further comprise a thickening agent. Known suspending agents include, but are not limited to, sorbitol syrup, hydrogenated edible fats, sodium alginate, polyvinylpyrrolidone, gum tragacanth, gum acacia, and cellulose derivatives such as sodium carboxymethylcellulose, methylcellulose, hydroxypropylmethylcellulose. Known dispersing or wetting agents include, but are not limited to, naturally-occurring phosphatides such as lecithin, condensation products of an alkylene oxide with a fatty acid, with a long chain aliphatic alcohol, with a partial ester derived from a fatty acid and a hexitol, or with a partial ester derived from a fatty acid and a hexitol anhydride (e.g., polyoxyethylene stearate, heptadecaethyleneoxycetanol, polyoxyethylene sorbitol monooleate, and polyoxyethylene sorbitan monooleate, respectively). Known emulsifying agents include, but are not limited to, lecithin, and acacia. Known preservatives include, but are not limited to, methyl, ethyl, or n-propyl para-hydroxybenzoates, ascorbic acid, and sorbic acid. Known sweetening agents include, for example, glycerol, propylene glycol, sorbitol, sucrose, and saccharin. Known thickening agents for oily suspensions include, for example, beeswax, hard paraffin, and cetyl alcohol.

Liquid solutions of the active ingredient in aqueous or oily solvents may be prepared in substantially the same manner as liquid suspensions, the primary difference being that the active ingredient is dissolved, rather than suspended in the solvent. As used herein, an "oily" liquid is one which comprises a carbon-containing liquid molecule and which exhibits a less polar character than water. Liquid solutions of the pharmaceutical composition of the invention may comprise each of the components described with regard to liquid suspensions, it being understood that suspending agents will not necessarily aid dissolution of the active ingredient in the solvent. Aqueous solvents include, for example, water, and isotonic saline. Oily solvents include, for example, almond oil, oily esters, ethyl alcohol, vegetable oils such as *arachis*, olive, sesame, or coconut oil, fractionated vegetable oils, and mineral oils such as liquid paraffin.

Powdered and granular formulations of a pharmaceutical preparation of the invention may be prepared using known methods. Such formulations may be administered directly to a subject, used, for example, to form tablets, to fill capsules, or to prepare an aqueous or oily suspension or solution by addition of an aqueous or oily vehicle thereto. Each of these formulations may further comprise one or more of dispersing or wetting agent, a suspending agent, and a preservative.

Additional excipients, such as fillers and sweetening, flavoring, or coloring agents, may also be included in these formulations.

A pharmaceutical composition of the invention may also be prepared, packaged, or sold in the form of oil-in-water emulsion or a water-in-oil emulsion. The oily phase may be a vegetable oil such as olive or *arachis* oil, a mineral oil such as liquid paraffin, or a combination of these. Such compositions may further comprise one or more emulsifying agents such as naturally occurring gums such as gum acacia or gum tragacanth, naturally-occurring phosphatides such as soybean or lecithin phosphatide, esters or partial esters derived from combinations of fatty acids and hexitol anhydrides such as sorbitan monooleate, and condensation products of such partial esters with ethylene oxide such as polyoxyethylene sorbitan monooleate. These emulsions may also contain additional ingredients including, for example, sweetening or flavoring agents.

Methods for impregnating or coating a material with a chemical composition are known in the art, and include, but are not limited to methods of depositing or binding a chemical composition onto a surface, methods of incorporating a chemical composition into the structure of a material during the synthesis of the material (i.e., such as with a physiologically degradable material), and methods of absorbing an aqueous or oily solution or suspension into an absorbent material, with or without subsequent drying.

Administration/Dosing:

The regimen of administration may affect what constitutes an effective amount. The therapeutic formulations may be administered to the patient either prior to or after the manifestation of symptoms associated with the disease or condition. Further, several divided dosages, as well as staggered dosages may be administered daily or sequentially, or the dose may be continuously infused, or may be a bolus injection. Further, the dosages of the therapeutic formulations may be proportionally increased or decreased as indicated by the exigencies of the therapeutic or prophylactic situation.

Administration of the compositions of the present invention to a patient, preferably a mammal, more preferably a human, may be carried out using known procedures, at dosages and for periods of time effective to treat a disease or condition in the patient. An effective amount of the therapeutic compound necessary to achieve a therapeutic effect may vary according to factors such as the activity of the particular compound employed; the time of administration; the rate of excretion of the compound; the duration of the treatment; other drugs, compounds or materials used in combination with the compound; the state of the disease or disorder, age, sex, weight, condition, general health and prior medical history of the patient being treated, and like factors well-known in the medical arts. Dosage regimens may be adjusted to provide the optimum therapeutic response. For example, several divided doses may be administered daily or the dose may be proportionally reduced as indicated by the exigencies of the therapeutic situation. A non-limiting example of an effective dose range for a therapeutic compound of the invention is from about 0.01 and 50 mg/kg of body weight/per day. One of ordinary skill in the art would be able to study the relevant factors and make the determination regarding the effective amount of the therapeutic compound without undue experimentation.

The compound can be administered to an animal as frequently as several times daily, or it may be administered less frequently, such as once a day, once a week, once every two weeks, once a month, or even less frequently, such as once every several months or even once a year or less. It is understood that the amount of compound dosed per day may be administered, in non-limiting examples, every day, every other day, every 2 days, every 3 days, every 4 days, or every 5 days. For example, with every other day administration, a 5 mg per day dose may be initiated on Monday with a first subsequent 5 mg per day dose administered on Wednesday, a second subsequent 5 mg per day dose administered on Friday, and so on. The frequency of the dose will be readily apparent to the skilled artisan and will depend upon any number of factors, such as, but not limited to, the type and severity of the disease being treated, the type and age of the animal, etc.

Actual dosage levels of the active ingredients in the pharmaceutical compositions of this invention may be varied so as to obtain an amount of the active ingredient that is effective to achieve the desired therapeutic response for a particular patient, composition, and mode of administration, without being toxic to the patient.

A medical doctor, e.g., physician or veterinarian, having ordinary skill in the art may readily determine and prescribe the effective amount of the pharmaceutical composition required. For example, the physician or veterinarian could start doses of the compounds of the invention employed in the pharmaceutical composition at levels lower than that required in order to achieve the desired therapeutic effect and gradually increase the dosage until the desired effect is achieved.

In particular embodiments, it is especially advantageous to formulate the compound in dosage unit form for ease of administration and uniformity of dosage. Dosage unit form as used herein refers to physically discrete units suited as unitary dosages for the patients to be treated; each unit containing a predetermined quantity of therapeutic compound calculated to produce the desired therapeutic effect in association with the required pharmaceutical vehicle. The dosage unit forms of the invention are dictated by and directly dependent on (a) the unique characteristics of the therapeutic compound and the particular therapeutic effect to be achieved, and (b) the limitations inherent in the art of compounding/formulating such a therapeutic compound for the treatment of cancer in a patient.

In one embodiment, the compositions of the invention are administered to the patient in dosages that range from one to five times per day or more. In another embodiment, the compositions of the invention are administered to the patient in a range of dosages that include, but are not limited to, once every day, every two, days, every three days to once a week, and once every two weeks. It will be readily apparent to one skilled in the art that the frequency of administration of the various combination compositions of the invention will vary from subject to subject depending on many factors including, but not limited to, age, disease or disorder to be treated, gender, overall health, and other factors. Thus, the invention should not be construed to be limited to any particular dosage regime and the precise dosage and composition to be administered to any patient will be determined by the attending physical taking all other factors about the patient into account.

Compounds of the invention for administration may be in the range of from about 1.ig to about 7,500 mg, about 20.ig to about 7,000 mg, about 40.ig to about 6,500 mg, about 80.ig to about 6,000 mg, about 100.ig to about 5,500 mg, about 200.ig to about 5,000 mg, about 400. ig to about 4,000 mg, about 800.ig to about 3,000 mg, about 1 mg to about 2,500 mg, about 2 mg to about 2,000 mg, about 5 mg to about 1,000 mg, about 10 mg to about 750 mg, about 20 mg to about 600 mg, about 30 mg to about 500 mg, about 40 mg to about 400 mg, about 50 mg to about 300 mg, about 60 mg to about 250 mg, about 70 mg to about 200 mg, about 80 mg to about 150 mg, and any and all whole or partial increments therebetween.

In some embodiments, the dose of a compound of the invention is from about 0.5.ig and about 5,000 mg. In some embodiments, a dose of a compound of the invention used in compositions described herein is less than about 5,000 mg, or less than about 4,000 mg, or less than about 3,000 mg, or less than about 2,000 mg, or less than about 1,000 mg, or less than about 800 mg, or less than about 600 mg, or less than about 500 mg, or less than about 200 mg, or less than about 50 mg. Similarly, in some embodiments, a dose of a second compound as described herein is less than about 1,000 mg, or less than about 800 mg, or less than about 600 mg, or less than about 500 mg, or less than about 400 mg, or less than about 300 mg, or less than about 200 mg, or less than about 100 mg, or less than about 50 mg, or less than about 40 mg, or less than about 30 mg, or less than about 25 mg, or less than about 20 mg, or less than about 15 mg, or less than about 10 mg, or less than about 5 mg, or less than about 2 mg, or less than about 1 mg, or less than about 0.5 mg, and any and all whole or partial increments thereof.

In one embodiment, the present invention is directed to a packaged pharmaceutical composition comprising a container holding a therapeutically effective amount of a compound of the invention, alone or in combination with a second pharmaceutical agent; and instructions for using the compound to treat, prevent, or reduce one or more symptoms of a disease or disorder in a patient.

The term "container" includes any receptacle for holding the pharmaceutical composition. For example, in one embodiment, the container is the packaging that contains the pharmaceutical composition. In other embodiments, the container is not the packaging that contains the pharmaceutical composition, i.e., the container is a receptacle, such as a box or vial that contains the packaged pharmaceutical composition or unpackaged pharmaceutical composition and the instructions for use of the pharmaceutical composition. Moreover, packaging techniques are well known in the art. It should be understood that the instructions for use of the pharmaceutical composition may be contained on the packaging containing the pharmaceutical composition, and as such the instructions form an increased functional relationship to the packaged product. However, it should be understood that the instructions may contain information pertaining to the compound's ability to perform its intended function, e.g., treating, preventing, or reducing a disease or disorder in a patient.

Routes of Administration:

Routes of administration of any of the compositions of the invention include inhalational, oral, nasal, rectal, parenteral, sublingual, transdermal, transmucosal (e.g., sublingual, lingual, (trans) buccal, (trans) urethral, vaginal (e.g., trans- and perivaginally), (intra) nasal, and (trans) rectal), intravesical, intrapulmonary, intraduodenal, intragastrical, intrathecal, subcutaneous, intramuscular, intradermal, intracranial, intraarterial, intravenous, intrabronchial, inhalation, and topical administration.

Suitable compositions and dosage forms include, for example, tablets, capsules, caplets, pills, gel caps, troches, dispersions, suspensions, solutions, syrups, granules, beads, transdermal patches, gels, powders, pellets, magmas, lozenges, creams, pastes, plasters, lotions, discs, suppositories, liquid sprays for nasal or oral administration, dry powder or aerosolized formulations for inhalation, compositions and formulations for intravesical administration and the like. It should be understood that the formulations and compositions that would be useful in the present invention are not limited to the particular formulations and compositions that are described herein.

Oral Administration

For oral application, particularly suitable are tablets, dragees, liquids, drops, suppositories, or capsules, caplets and gelcaps. Other formulations suitable for oral administration include, but are not limited to, a powdered or granular formulation, an aqueous or oily suspension, an aqueous or oily solution, a paste, a gel, toothpaste, a mouthwash, a coating, an oral rinse, or an emulsion. The compositions intended for oral use may be prepared according to any method known in the art and such compositions may contain one or more agents selected from the group consisting of inert, non-toxic pharmaceutically excipients which are suitable for the manufacture of tablets. Such excipients include, for example, an inert diluent such as lactose; granulating and disintegrating agents such as cornstarch; binding agents such as starch; and lubricating agents such as magnesium stearate.

Tablets may be non-coated or they may be coated using known methods to achieve delayed disintegration in the gastrointestinal tract of a subject, thereby providing sustained release and absorption of the active ingredient. By way of example, a material such as glyceryl monostearate or glyceryl distearate may be used to coat tablets. Further by way of example, tablets may be coated using methods described in U.S. Pat. Nos. 4,256,108; 4,160,452; and 4,265,874 to form osmotically controlled-release tablets. Tablets may further comprise a sweetening agent, a flavoring agent, a coloring agent, a preservative, or some combination of these in order to provide for pharmaceutically elegant and palatable preparation.

For oral administration, the compounds of the invention may be in the form of tablets or capsules prepared by conventional means with pharmaceutically acceptable excipients such as binding agents; fillers; lubricants; disintegrates; or wetting agents. If desired, the tablets may be coated using suitable methods and coating materials such as OPADRY™ film coating systems available from Colorcon, West Point, Pa. (e.g., OPADRY™ OY Type, OYC Type, Organic Enteric OY-P Type, Aqueous Enteric OY-A Type, OY-PM Type and OPADRY™ White, 32K18400).

Liquid preparation for oral administration may be in the form of solutions, syrups or suspensions. The liquid preparations may be prepared by conventional means with pharmaceutically acceptable additives such as suspending agents (e.g., sorbitol syrup, methylcellulose or hydrogenated edible fats); emulsifying agent (e.g., lecithin or acacia); non-aqueous vehicles (e.g., almond oil, oily esters or ethyl alcohol); and preservatives (e.g., methyl or propyl para-hydroxy benzoates or sorbic acid). Liquid formulations of a pharmaceutical composition of the invention which are suitable for oral administration may be prepared, packaged, and sold either in liquid form or in the form of a dry product intended for reconstitution with water or another suitable vehicle prior to use.

Parenteral Administration

As used herein, "parenteral administration" of a pharmaceutical composition includes any route of administration characterized by physical breaching of a tissue of a subject and administration of the pharmaceutical composition through the breach in the tissue. Parenteral administration thus includes, but is not limited to, administration of a pharmaceutical composition by injection of the composition, by application of the composition through a surgical incision, by application of the composition through a tissue-penetrating non-surgical wound, and the like. In particular, parenteral administration is contemplated to include, but is not limited to, intracranial, subcutaneous, intravenous, intraperitoneal, intramuscular, intraspinal, intrasternal, intrathecal, brain stem injection, and kidney dialytic infusion techniques.

Formulations of a pharmaceutical composition suitable for parenteral administration comprise the active ingredient combined with a pharmaceutically acceptable carrier, such as sterile water or sterile isotonic saline. Such formulations may be prepared, packaged, or sold in a form suitable for bolus administration or for continuous administration. Injectable formulations may be prepared, packaged, or sold in unit dosage form, such as in ampules or in multi-dose containers containing a preservative. Formulations for parenteral administration include, but are not limited to, suspensions, solutions, emulsions in oily or aqueous vehicles, pastes, and implantable sustained-release or biodegradable formulations. Such formulations may further comprise one or more additional ingredients including, but not limited to, suspending, stabilizing, or dispersing agents. In one embodiment of a formulation for parenteral administration, the active ingredient is provided in dry (i.e., powder or granular) form for reconstitution with a suitable vehicle (e.g., sterile pyrogen-free water) prior to parenteral administration of the reconstituted composition.

The pharmaceutical compositions may be prepared, packaged, or sold in the form of asterile injectable aqueous or oily suspension or solution. This suspension or solution may be formulated according to the known art and may comprise, in addition to the active ingredient, additional ingredients such as the dispersing agents, wetting agents, or suspending agents described herein. Such sterile injectable formulations may be prepared using a non-toxic parenterally-acceptable diluent or solvent, such as water or 1,3-butanediol, for example. Other acceptable diluents and solvents include, but are not limited to, Ringer's solution, isotonic sodium chloride solution, and fixed oils such as synthetic mono- or diglycerides. Other parentally-administrable formulations which are useful include those which comprise the active ingredient in microcrystalline form, in a liposomal preparation, or as a component of a biodegradable polymer system. Compositions for sustained release or implantation may comprise pharmaceutically acceptable polymeric or hydrophobic materials such as an emulsion, an ion exchange resin, a sparingly soluble polymer, or a sparingly soluble salt.

Additional Administration Forms

Additional dosage forms of this invention include dosage forms as described in U.S. U.S. Pat. Nos. 6,340,475, 6,488,962, 6,451,808, 5,972,389, 5,582,837, and 5,007,790. Additional dosage forms of this invention also include dosage forms as described in U.S. patents applications Ser. Nos. 20/030,147952, 20030104062, 20030104053, 20030044466, 20030039688, and 20020051820. Additional dosage forms of this invention also include dosage forms as described in PCT Applications Nos. WO 03/35041, WO 03/35040, WO 03/35029, WO 03/35177, WO 03/35039, WO 02/96404, WO 02/32416, WO 01/97783, WO 01/56544, WO 01/32217, WO 98/55107, WO 98/11879, WO 97/47285, WO 93/18755, and WO 90/11757.

Controlled Release Formulations and Drug Delivery Systems

Controlled- or sustained-release formulations of a pharmaceutical composition of the invention may be made using conventional technology. In some cases, the dosage forms to be used can be provided as slow or controlled-release of one or more active ingredients therein using, for example, hydropropylmethyl cellulose, other polymer matrices, gels, permeable membranes, osmotic systems, multilayer coatings, microparticles, liposomes, or microspheres or a combination thereof to provide the desired release profile in varying proportions. Suitable controlled-release formulations known to those of ordinary skill in the art, including those described herein, can be readily selected for use with the pharmaceutical compositions of the invention. Thus, single unit dosage forms suitable for oral administration, such as tablets, capsules, gelcaps, and caplets, which are adapted for controlled-release are encompassed by the present invention.

Most controlled-release pharmaceutical products have a common goal of improving drug therapy over that achieved by their non-controlled counterparts. Ideally, the use of an optimally designed controlled-release preparation in medical treatment is characterized by a minimum of drug substance being employed to cure or control the condition in a minimum amount of time.

Advantages of controlled-release formulations include extended activity of the drug, reduced dosage frequency, and increased patient compliance. In addition, controlled-release formulations can be used to affect the time of onset of action or other characteristics, such as blood level of the drug, and thus can affect the occurrence of side effects.

Most controlled-release formulations are designed to initially release an amount of drug that promptly produces the desired therapeutic effect, and gradually and continually release of other amounts of the drug to maintain this level of therapeutic effect over an extended period of time. In order to maintain this constant level of drug in the body, the drug must be released from the dosage form at a rate that will replace the amount of drug being metabolized and excreted from the body.

Controlled-release of an active ingredient can be stimulated by various inducers, for example, pH, temperature, enzymes, water, or other physiological conditions or compounds. The term "controlled-release component" in the context of the present invention is defined herein as a compound or compounds, including, but not limited to, polymers, polymer matrices, gels, permeable membranes, liposomes, or microspheres or a combination thereof that facilitates the controlled-release of the active ingredient.

In certain embodiments, the formulations of the present invention may be, but are not limited to, short-term, rapid-offset, as well as controlled, for example, sustained release, delayed-release and pulsatile release formulations.

The term sustained release is used in its conventional sense to refer to a drug formulation that provides for a gradual release of a drug over an extended period of time, and that may, although not necessarily, result in substantially constant blood levels of a drug over an extended time period. The period of time may be as long as a month or more and should be a release which is longer than the same amount of agent administered in bolus form.

For sustained release, the compounds may be formulated with a suitable polymer or hydrophobic material which provides sustained release properties to the compounds. As such, the compounds for use the method of the invention may be administered in the form of microparticles, for example, by injection or in the form of wafers or discs by implantation. In a preferred embodiment of the invention, the compounds of the invention are administered to a patient, alone or in combination with another pharmaceutical agent, using a sustained release formulation.

The term delayed-release is used herein in its conventional sense to refer to a drug formulation that provides for an initial release of the drug after some delay following drug administration and that mat, although not necessarily, includes a delay of from about 10 minutes up to about 12 hours.

The term pulsatile release is used herein in its conventional sense to refer to a drug formulation that provides release of the drug in such a way as to produce pulsed plasma profile of the drug after drug administration.

The term immediate release is used in its conventional sense to refer to a drug formulation that provides for release of the drug immediately after drug administration.

As used herein, short-term refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes and any or all whole or partial increments thereof after drug administration after drug administration.

As used herein, rapid-offset refers to any period of time up to and including about 8 hours, about 7 hours, about 6 hours, about 5 hours, about 4 hours, about 3 hours, about 2 hours, about 1 hour, about 40 minutes, about 20 minutes, or about 10 minutes, and any and all whole or partial increments thereof after drug administration.

Those skilled in the art will recognize or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

Definitions

To aid in understanding the detailed description of the compositions and methods according to the disclosure, a few express definitions are provided to facilitate an unambiguous disclosure of the various aspects of the disclosure. Unless otherwise defined, all technical and scientific terms used herein have the same meaning as commonly understood by one of ordinary skill in the art to which this disclosure belongs.

As used herein, "expression" refers to the process by which a polynucleotide is transcribed from a DNA template (such as into an mRNA or other RNA transcript) and/or the process by which a transcribed mRNA is subsequently translated into peptides, polypeptides, or proteins. Transcripts and encoded polypeptides may be collectively referred to as "gene product." If the polynucleotide is derived from genomic DNA, expression may include splicing of the mRNA in a eukaryotic cell.

The term "gene" refers to a nucleic acid (e.g., DNA or RNA) sequence that comprises coding sequences necessary for the production of an RNA, or a polypeptide or its precursor (e.g., proinsulin). A functional polypeptide can be encoded by a full-length coding sequence or by any portion of the coding sequence as long as the desired activity or functional properties (e.g., enzymatic activity, ligand binding, signal transduction, etc.) of the polypeptide are retained. The term "portion" when used in reference to a gene refers to fragments of that gene. The fragments may range in size from a few nucleotides to the entire gene sequence minus one nucleotide. Thus, "a nucleotide comprising at least a portion of a gene" may comprise fragments of the gene or the entire gene.

The term "gene" also encompasses the coding regions of a structural gene and includes sequences located adjacent to the coding region on both the 5' and 3' ends for a distance of about 1 kb on either end such that the gene corresponds to the length of the full-length mRNA. The sequences which are located 5' of the coding region and which are present on the mRNA are referred to as 5' non-translated sequences. The sequences which are located 3' or downstream of the coding region and which are present on the mRNA are referred to as 3' non-translated sequences. The term "gene" encompasses both cDNA and genomic forms of a gene.

A genomic form or clone of a gene contains the coding region interrupted with non-coding sequences termed "introns" or "intervening regions" or "intervening sequences." Introns are segments of a gene which are transcribed into nuclear RNA (hnRNA); introns may contain regulatory elements such as enhancers. Introns are removed or "spliced out" from the nuclear or primary transcript; introns, therefore, are absent in the messenger RNA (mRNA) transcript.

The mRNA functions during translation to specify the sequence or order of amino acids in a nascent polypeptide.

"Gene transfer" and "gene delivery" refer to methods or systems for reliably inserting a particular nucleic acid sequence into targeted cells.

The term "recombinant" when made in reference to a nucleic acid molecule refers to a nucleic acid molecule which is comprised of segments of nucleic acid joined together by means of molecular biological techniques. The term "recombinant," when made in reference to a protein or a polypeptide, refers to a protein molecule which is expressed using a recombinant nucleic acid molecule.

The term "operably linked" refers to functional linkage between a regulatory sequence and a heterologous nucleic acid sequence resulting in expression of the latter. For example, a first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein-coding regions, in the same reading frame.

As used herein, the term "in vitro" refers to events that occur in an artificial environment, e.g., in a test tube or reaction vessel, in cell culture, etc., rather than within a multi-cellular organism.

As used herein, the term "in vivo" refers to events that occur within a multi-cellular organism such as a non-human animal.

As used herein, "treatment" or "treating," or "palliating" or "ameliorating" are used interchangeably. These terms refer to an approach for obtaining beneficial or desired results including but not limited to a therapeutic benefit and/or a prophylactic benefit. By therapeutic benefit is meant any therapeutically relevant improvement in or effect on one or more diseases, conditions, or symptoms under treatment. For prophylactic benefit, the compositions may be administered to a subject at risk of developing a particular disease, condition, or symptom, or to a subject reporting one or more of the physiological symptoms of a disease, even though the disease, condition, or symptom may not have yet been manifested.

The terms "prevent," "preventing," "prevention," "prophylactic treatment" and the like refer to reducing the probability of developing a disorder or condition in a subject, who does not have, but is at risk of or susceptible to developing a disorder or condition.

The term "disease" as used herein is intended to be generally synonymous, and is used interchangeably with, the terms "disorder" and "condition" (as in medical condition), in that all reflect an abnormal condition of the human or animal body or of one of its parts that impairs normal functioning, is typically manifested by distinguishing signs and symptoms, and causes the human or animal to have a reduced duration or quality of life.

The terms "decrease," "reduced," "reduction," "decrease," or "inhibit" are all used herein generally to mean a decrease by a statistically significant amount. However, for avoidance of doubt, "reduced", "reduction" or "decrease" or "inhibit" means a decrease by at least 10% as compared to a reference level, for example a decrease by at least about 20%, or at least about 30%, or at least about 40%, or at least about 50%, or at least about 60%, or at least about 70%, or at least about 80%, or at least about 90% or up to and including a 100% decrease (e.g. absent level as compared to a reference sample), or any decrease between 10-100% as compared to a reference level.

As used herein, the term "modulate" is meant to refer to any change in biological state, i.e. increasing, decreasing, and the like.

The terms "increased", "increase" or "enhance" or "activate" are all used herein to generally mean an increase by a statically significant amount; for the avoidance of any doubt, the terms "increased", "increase" or "enhance" or "activate" means an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level.

The term "effective amount," "effective dose," or "effective dosage" is defined as an amount sufficient to achieve or at least partially achieve a desired effect. A "therapeutically effective amount" or "therapeutically effective dosage" of a drug or therapeutic agent is any amount of the drug that, when used alone or in combination with another therapeutic agent, promotes disease regression evidenced by a decrease in severity of disease symptoms, an increase in frequency and duration of disease symptom-free periods, or a prevention of impairment or disability due to the disease affliction. A "prophylactically effective amount" or a "prophylactically effective dosage" of a drug is an amount of the drug that, when administered alone or in combination with another therapeutic agent to a subject at risk of developing a disease or of suffering a recurrence of disease, inhibits the development or recurrence of the disease. The ability of a therapeutic or prophylactic agent to promote disease regression or inhibit the development or recurrence of the disease can be evaluated using a variety of methods known to the skilled practitioner, such as in human subjects during clinical trials, in animal model systems predictive of efficacy in humans, or by assaying the activity of the agent in in vitro assays.

Doses are often expressed in relation to bodyweight. Thus, a dose which is expressed as [g, mg, or other unit]/kg (or g, mg etc.) usually refers to [g, mg, or other unit] "per kg (or g, mg etc.) bodyweight", even if the term "bodyweight" is not explicitly mentioned.

The term "agent" is used herein to denote a chemical compound, a mixture of chemical compounds, a biological macromolecule (such as a nucleic acid, an antibody, a protein or portion thereof, e.g., a peptide), or an extract made from biological materials such as bacteria, plants, fungi, or animal (particularly mammalian) cells or tissues. The activity of such agents may render it suitable as a "therapeutic agent," which is a biologically, physiologically, or pharmacologically active substance (or substances) that acts locally or systemically in a subject.

The terms "therapeutic agent," "therapeutic capable agent," or "treatment agent" are used interchangeably and refer to a molecule or compound that confers some beneficial effect upon administration to a subject. The beneficial effect includes enablement of diagnostic determinations; amelioration of a disease, symptom, disorder, or pathological condition; reducing or preventing the onset of a disease, symptom, disorder or condition; and generally counteracting a disease, symptom, disorder or pathological condition.

"Combination" therapy, as used herein, unless otherwise clear from the context, is meant to encompass administration of two or more therapeutic agents in a coordinated fashion, and includes, but is not limited to, concurrent dosing. Specifically, combination therapy encompasses both co-administration (e.g., administration of a co-formulation or simultaneous administration of separate therapeutic compositions) and serial or sequential administration, provided that administration of one therapeutic agent is conditioned in some way on administration of another therapeutic agent. For example, one therapeutic agent may be administered only after a different therapeutic agent has been administered and allowed to act for a prescribed period of time. See, e.g., Kohrt et al. (2011) Blood 117:2423.

"Sample," "test sample," and "patient sample" may be used interchangeably herein. The sample can be a sample of, serum, urine plasma, amniotic fluid, cerebrospinal fluid, cells (e.g., antibody-producing cells) or tissue. Such a sample can be used directly as obtained from a patient or can be pre-treated, such as by filtration, distillation, extraction, concentration, centrifugation, inactivation of interfering components, addition of reagents, and the like, to modify the character of the sample in some manner as discussed herein or otherwise as is known in the art. The terms "sample" and "biological sample" as used herein generally refer to a biological material being tested for and/or suspected of containing an analyte of interest such as antibodies. The sample may be any tissue sample from the subject. The sample may comprise protein from the subject.

"Homologous" as used herein, refers to the subunit sequence identity between two polymeric molecules, e.g., between two nucleic acid molecules, such as, two DNA molecules or two RNA molecules, or between two polypeptide molecules. When a subunit position in both of the two molecules is occupied by the same monomeric subunit; e.g., if a position in each of two DNA molecules is occupied by adenine, then they are homologous at that position. The homology between two sequences is a direct function of the number of matching or homologous positions; e.g., if half (e.g., five positions in a polymer ten subunits in length) of the positions in two sequences are homologous, the two sequences are 50% homologous; if 90% of the positions (e.g., 9 of 10), are matched or homologous, the two sequences are 90% homologous. By way of example, the DNA sequences 5'-ATTGCC-3' and 5'-TATGGC-3' share 50% homology.

An "inducible" promoter is a nucleotide sequence that, when operably linked with a polynucleotide that encodes or specifies a gene product, causes the gene product to be produced in a cell substantially only when an inducer that corresponds to the promoter is present in the cell.

The terms "inhibit" and "antagonize," as used herein, mean to reduce a molecule, a reaction, an interaction, a gene, an mRNA, and/or a protein's expression, stability, function or activity by a measurable amount or to prevent entirely. Inhibitors are compounds that, e.g., bind to, partially or totally block stimulation, decrease, prevent, delay activation, inactivate, desensitize, or down regulate a protein, a gene, and an mRNA stability, expression, function and activity, e.g., antagonists.

"Instructional material," as that term is used herein, includes a publication, a recording, a diagram, or any other medium of expression that can be used to communicate the usefulness of any composition and/or compound of the invention in a kit. The instructional material of the kit may, for example, be affixed to a container that contains any composition of the invention or be shipped together with a container which contains any composition. Alternatively, the instructional material may be shipped separately from the container with the intention that the recipient uses the instructional material and any composition cooperatively. Delivery of the instructional material may be, for example, by physical delivery of the publication or other medium of expression communicating the usefulness of the kit, or may alternatively be achieved by electronic transmission, for example by means of a computer, such as by electronic mail, or download from a website.

"Isolated" means altered or removed from the natural state. For example, a nucleic acid or a peptide naturally present in a living animal is not "isolated," but the same nucleic acid or peptide partially or completely separated from the coexisting materials of its natural state is "isolated." An isolated nucleic acid or protein may exist in substantially purified form or may exist in a non-native environment such as, for example, a host cell.

An "isolated nucleic acid" refers to a nucleic acid segment or fragment which has been separated from sequences which flank it in a naturally occurring state, i.e., a DNA fragment which has been removed from the sequences that are normally adjacent to the fragment, i.e., the sequences adjacent to the fragment in a genome in which it naturally occurs. The term also applies to nucleic acids that have been substantially purified from other components which naturally accompany the nucleic acid, i.e., RNA or DNA or proteins, which naturally accompany it in the cell. The term therefore includes, for example, a recombinant DNA that is incorporated into a vector, into an autonomously replicating plasmid or virus, or into the genomic DNA of a prokaryote or eukaryote, or which exists as a separate molecule (i.e., as a cDNA or a genomic or cDNA fragment produced by PCR or restriction enzyme digestion) independent of other sequences. It also includes a recombinant DNA that is part of a hybrid gene encoding additional polypeptide sequence.

Unless otherwise specified, a "nucleotide sequence encoding an amino acid sequence" includes all nucleotide sequences that are degenerate versions of each other and that encode the same amino acid sequence. The phrase nucleotide sequence that encodes a protein or an RNA may also include introns to the extent that the nucleotide sequence encoding the protein may in some version contain an intron(s).

"Parenteral" administration of a composition includes, e.g., subcutaneous (s.c.), intravenous (i.v.), intramuscular (i.m.), or intrasternal injection, intrathecal, or infusion techniques.

As used herein, the term "pharmaceutical composition" refers to a mixture of at least one compound useful within the invention with other chemical components, such as carriers, stabilizers, diluents, dispersing agents, suspending agents, thickening agents, and/or excipients. The pharmaceutical composition facilitates administration of the compound to an organism.

Multiple techniques of administering a compound exist in the art including, but not limited to, intravenous, oral, aerosol, parenteral, ophthalmic, pulmonary and topical administration.

As used herein, the term "pharmaceutically acceptable" refers to a material, such as a carrier or diluent, which does not abrogate the biological activity or properties of the composition, and is relatively non-toxic, i.e., the material may be administered to an individual without causing undesirable biological effects or interacting in a deleterious manner with any of the components of the composition in which it is contained.

The language "pharmaceutically acceptable carrier" includes a pharmaceutically acceptable salt, pharmaceutically acceptable material, composition or carrier, such as a liquid or solid filler, diluent, excipient, solvent or encapsulating material, involved in carrying or transporting a compound(s) of the present invention within or to the subject such that it may perform its intended function. Typically, such compounds are carried or transported from one organ, or portion of the body, to another organ, or portion of the body. Each salt or carrier must be "acceptable" in the sense of being compatible with the other ingredients of the formulation, and not injurious to the subject. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; phosphate buffer solutions; diluent; granulating agent; lubricant; binder; disintegrating agent; wetting agent; emulsifier; coloring agent; release agent; coating agent; sweetening agent; flavoring agent; perfuming agent; preservative; antioxidant; plasticizer; gelling agent; thickener; hardener; setting agent; suspending agent; surfactant; humectant; carrier; stabilizer; and other non-toxic compatible substances employed in pharmaceutical formulations, or any combination thereof. As used herein, "pharmaceutically acceptable carrier" also includes any and all coatings, antibacterial and antifungal agents, and absorption delaying agents, and the like that are compatible with the activity of the compound, and are physiologically acceptable to the subject. Supplementary active compounds may also be incorporated into the compositions.

As used herein, the language "pharmaceutically acceptable salt" refers to a salt of the administered compounds prepared from pharmaceutically acceptable non-toxic acids, including inorganic acids, organic acids, solvates, hydrates, or clathrates thereof.

"Polypeptide" refers to a polymer composed of amino acid residues, related naturally occurring structural variants, and synthetic non-naturally occurring analogs thereof linked via peptide bonds. Synthetic polypeptides can be synthesized, for example, using an automated polypeptide synthesizer. The term "protein" typically refers to large polypeptides. The term "peptide" typically refers to short polypeptides.

Conventional notation is used herein to portray polypeptide sequences: the left-hand end of a polypeptide sequence is the amino-terminus; the right-hand end of a polypeptide sequence is the carboxyl-terminus. As used herein, a "peptidomimetic" is a compound containing non-peptidic structural elements that is capable of mimicking the biological action of a parent peptide. A peptidomimetic may or may not comprise peptide bonds.

The term "promoter" as used herein is defined as a DNA sequence recognized by the synthetic machinery of the cell, or introduced synthetic machinery, required to initiate the specific transcription of a polynucleotide sequence.

As used herein, the term "promoter/regulatory sequence" means a nucleic acid sequence which is required for expression of a gene product operably linked to the promoter/regulatory sequence. In some instances, this sequence may be the core promoter sequence and in other instances, this sequence may also include an enhancer sequence and other regulatory elements that are required for expression of the gene product. The promoter/regulatory sequence may for example be one that expresses the gene product in a tissue specific manner.

The term "recombinant polypeptide" as used herein is defined as a polypeptide produced by using recombinant DNA methods. The term "recombinant DNA" as used herein is defined as DNA produced by joining pieces of DNA from different sources.

The term "RNA" as used herein is defined as ribonucleic acid. By the term "specifically bind" or "specifically binds," as used herein, is meant that a first molecule (e.g., an antibody) preferentially binds to a second molecule (e.g., a particular antigenic epitope), but does not necessarily bind only to that second molecule.

As used herein, a "subject" refers to a human or non-human mammal. Non-human mammals include, for example, livestock and pets, such as ovine, bovine, porcine, canine, feline and murine mammals. In certain embodiments, the subject is human. A "tissue-specific" promoter is a nucleotide sequence that, when operably linked with a polynucleotide encodes or specified by a gene, causes the gene product to be produced in a cell substantially only if the cell is a cell of the tissue type corresponding to the promoter.

The term "transfected" or "transformed" or "transduced" as used herein refers to a process by which exogenous nucleic acid is transferred or introduced into the host cell. A "transfected" or "transformed" or "transduced" cell has been transfected, transformed or transduced with exogenous nucleic acid. The cell includes the primary subject cell and its progeny.

The phrase "under transcriptional control" or "operatively linked" as used herein means that the promoter is in the correct location and orientation in relation to a polynucleotide to control the initiation of transcription by RNA polymerase and expression of the polynucleotide. "Variant" as the term is used herein, is a nucleic acid sequence or a peptide sequence that differs in sequence from a reference nucleic acid sequence or peptide sequence respectively, but retains essential properties of the reference molecule. Changes in the sequence of a nucleic acid variant may not alter the amino acid sequence of a peptide encoded by the reference nucleic acid, or may result in amino acid substitutions, additions, deletions, fusions, and truncations. Changes in the sequence of peptide variants are typically limited or conservative, so that the sequences of the reference peptide and the variant are closely similar overall and, in many regions, identical.

A variant and reference peptide may differ in amino acid sequence by one or more substitutions, additions, or deletions in any combination. A variant of a nucleic acid or peptide may be a naturally occurring such as an allelic variant or may be a variant that is not known to occur naturally. Non-naturally occurring variants of nucleic acids and peptides may be made by mutagenesis techniques or by direct synthesis.

A "vector" is a composition of matter that comprises an isolated nucleic acid and that may be used to deliver the isolated nucleic acid to the interior of a cell. Numerous vectors are known in the art including, but not limited to, linear polynucleotides, polynucleotides associated with ionic or amphiphilic compounds, plasmids, and viruses. Thus, the term "vector" includes an autonomously replicating plasmid or a virus. The term should also be construed to include non-plasmid and non-viral compounds which facilitate the transfer of nucleic acid into cells, such as, for example, polylysine compounds, liposomes, and the like. Examples of viral vectors include, but are not limited to, adenoviral vectors, adeno-associated virus vectors, retroviral vectors, and the like.

As used herein, the term "virus" is defined as a particle consisting of nucleic acid (RNA or DNA) enclosed in a protein coat, with or without an outer lipid envelope, which is capable of transfecting the cell with its nucleic acid.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

It is noted here that, as used in this specification and the appended claims, the singular forms "a," "an," and "the" include plural reference unless the context clearly dictates otherwise.

The terms "including," "comprising," "containing," or "having" and variations thereof are meant to encompass the items listed thereafter and equivalents thereof as well as additional subject matter unless otherwise noted.

The phrases "in one embodiment," "in various embodiments," "in some embodiments," and the like are used repeatedly. Such phrases do not necessarily refer to the same embodiment, but they may unless the context dictates otherwise.

The terms "and/or" or "/" means any one of the items, any combination of the items, or all of the items with which this term is associated.

The word "substantially" does not exclude "completely," e.g., a composition which is "substantially free" from Y may be completely free from Y. Where necessary, the word "substantially" may be omitted from the definition of the invention.

As used herein, the term "approximately" or "about," as applied to one or more values of interest, refers to a value that is similar to a stated reference value. In some embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). Unless indicated otherwise herein, the term "about" is intended to include values, e.g., weight percents, proximate to the recited range that are equivalent in terms of the functionality of the individual ingredient, the composition, or the embodiment.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise.

In cases in which a method comprises a combination of steps, each and every combination or sub-combination of the steps is encompassed within the scope of the disclosure, unless otherwise noted herein.

Each publication, patent application, patent, and other reference cited herein is incorporated by reference in its entirety to the extent that it is not inconsistent with the present disclosure. Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates, which may need to be independently confirmed.

It is understood that the examples and embodiments described herein are for illustrative purposes only and that various modifications or changes in light thereof will be suggested to persons skilled in the art and are to be included within the spirit and purview of this application and scope of the appended claims.

EXAMPLES

Example 1

Figure 1:
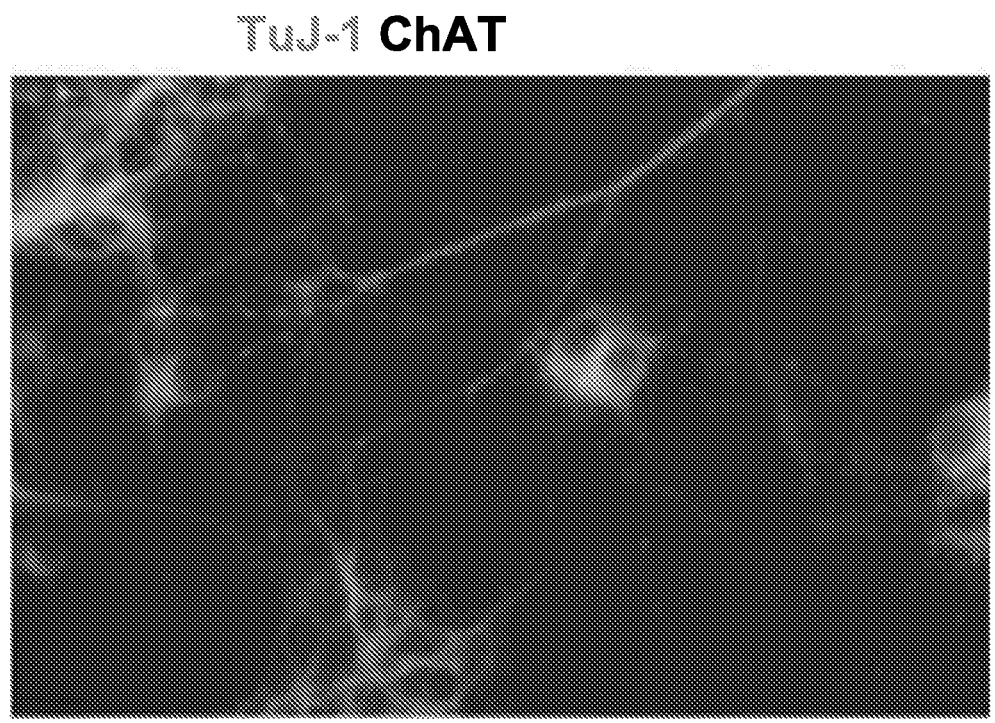
FIG. 1 shows neurons differentiated from ALS-patient derived iPSC after 40 days in vitro using established methodologies. (Kiskinis et.al., 2014, Cell Stem Cell). Cells are positive for the neuronal marker TuJ-1 and the motor neuron marker choline acetyltransferase (ChAT).
Figure 2:
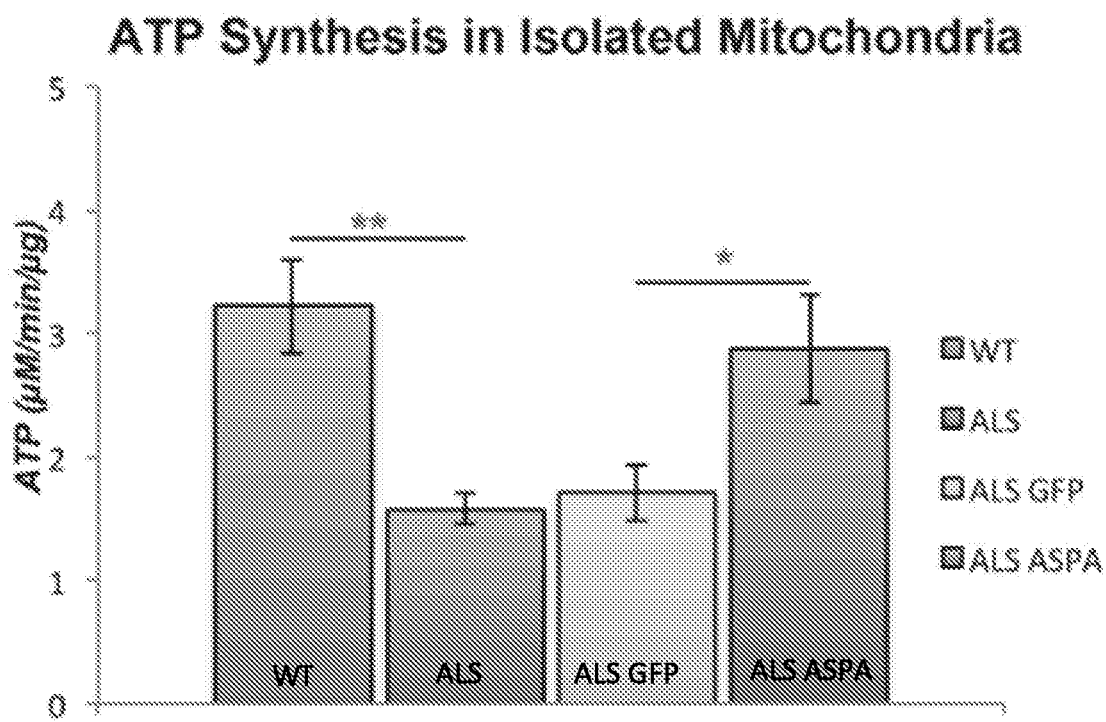
FIG. 2 shows the rescue of mitochondrial adenosine triphosphate (ATP) synthesis following treatment with AAV-ASPA. Motor neuron cultures generated from ALS iPSC were transduced on day 28 in culture with adeno-associated viral vectors (AAV) to deliver either ASPA or GFP. At day 40, intact mitochondria were isolated from cells and assayed for ATP synthesis. Naïve wild type, non-ALS cells (WT), naïve ALS SOD1 mutant cells (ALS), AAV-GFP SOD1 mutant cells (ALS GFP), and AAV-ASPA SOD1 mutant cells (ALS ASPA) were assayed (n=5/group). A significant 1.5-fold increase in the rate of ATP synthesis (jiM ATP per minute per jig of isolated mitochondria, 15jig used per reaction) was observed in AAV-ASPA treated ALS cells relative to AAV-GFP negative controls. ** p<0.005, *p<0.05.

Unless otherwise noted, all starting materials were obtained from commercial suppliers and used without purification. As described herein, patient-derived induced pluripotent stem cells (iPSC) were obtained from an NIH-funded biorepository (www.nimhgenetics org/available-_data/ipsc/). Both normal healthy cells and cells from an individual harboring a mutation in SOD1 (N139K) and diagnosed with familial ALS were used. A differentiation protocol has been established that results in cultures of motor neurons after 40 days of treatment with a defined regimen of growth factors and specialized media (FIG. 1). Therapeutic (ASPA) and control (GFP) genes were packaged into AAV vectors, and an initial cohort of cells treated to assess effects on mitochondrial function. Mitochondria isolated from SOD1 mutant motor neurons were shown to have lower rates of ATP synthesis as compared to wild type cells, and transduction of these mutant cells with AAV-ASPA resulted in a significant rescue of ATP synthesis rate in mitochondria relative to AAV-GFP controls, as assessed by a luminescence-based in situ assay (FIG. 2).

Example 2

Analysis of ASPA-derived free aspartate promotion of ATP synthesis in isolated mitochondria from 16 week-old SOD G93A mouse spinal cord.

Figure 8:
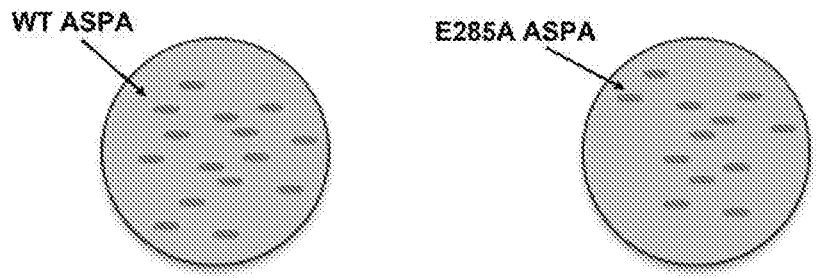
FIG. 8 is a methodology schematic for the demonstration of ASPA-generated free aspartate driving oxidative phosphorylation and ATP synthesis in isolated spinal cord mitochondria. (1) 60 mm dishes of HeLa cells were transfected with plasmids for either constitutively expressed wild type human ASPA (WT) or a non-functional mutant isoform (E285A). (2) Transfected cells are harvested after 48 hours and mechanically lysed by sonication. (3) 50 μl of lysates are added to a reaction mixture containing 5 mM purified NAA and incubated at 37° C. for 2 hours to allow transfected ASPA enzyme to catabolize the NAA substrate. (4) Catabolic reactions are heat-inactivated and 50 μl added to isolated mitochondria in a reaction mix for a luminescence-based ATP synthesis assay.
Figure 8:
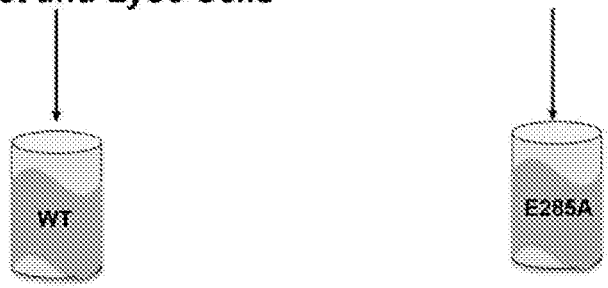
Figure 8:
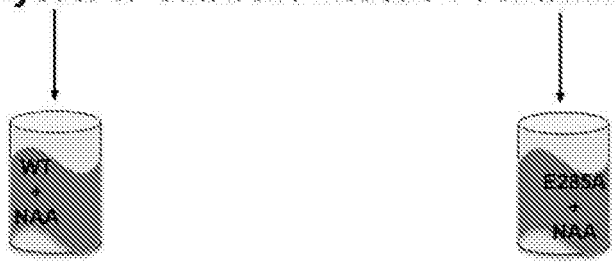
Figure 8:
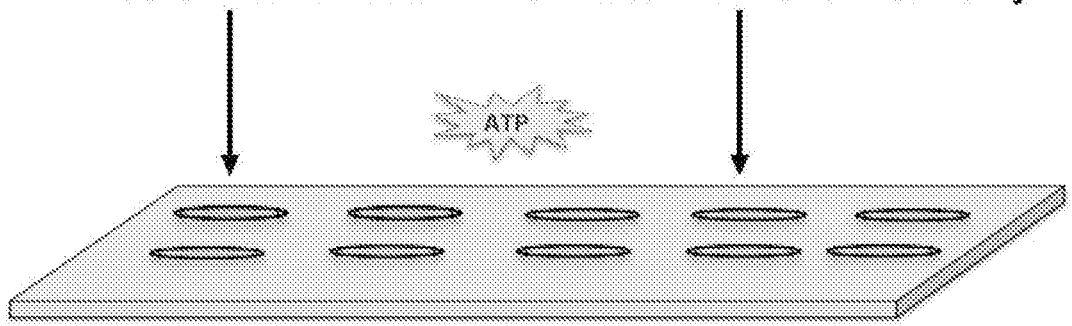
Figure 9:
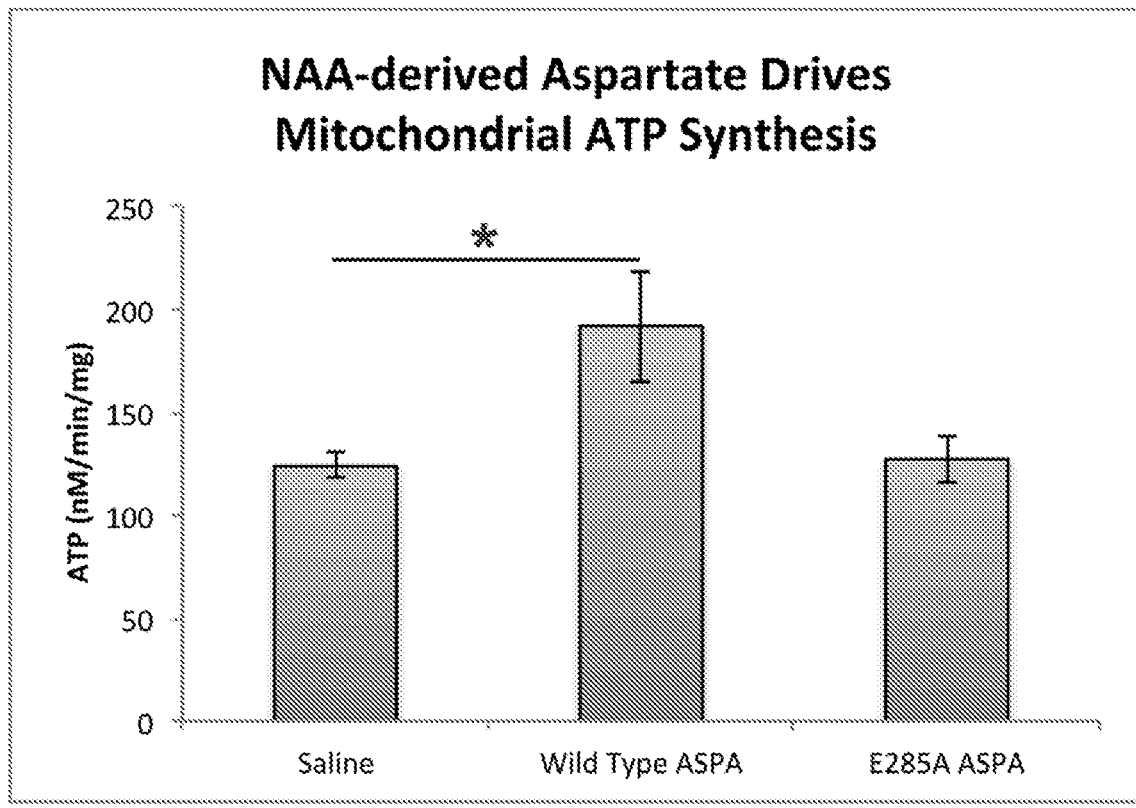
FIG. 9 Shows rates of ATP synthesis in mitochondria isolated from G93A SOD spinal cords and incubated with reaction mixtures derived from wild type ASPA transfected, E285A ASPA transfected, or Saline treated HeLa cells as outlined schematically in FIG. 8. The addition of wild type ASPA-fueled reaction product resulted in a significant increase in ATP synthesis rate (p=0.039) that was proportional to the aspartate content of aliquots (see Table. 1).

Mitochondria were isolated from whole 16-week old SOD G93A spinal cords using mechanical homogenization and differential centrifugation. Mitochondria were kept on ice until used for assays. The rate of ATP synthesis was analyzed in 30 µg of isolated mitochondria using a commercially available luminescence-based kit. A reaction mixture containing 1.0 mM malate, 1.0 mM glutamate, 10 mM NADH, and 0.2 mM ADP was prepared in a solution containing luciferase and luciferin, and 30 µg of mitochondria added. The addition of 2U/ml of aspartate aminotransferase and 3U/ml malate dehydrogenase drives the MAS and initiates ATP synthesis. In the present example, free aspartate was substituted for a reaction product generated by the incubation of lysates from cells overexpressing either wild type ASPA or a non-functional mutant ASPA with 5 mM NAA, as per the scheme in FIG. 8. Addition of wild type ASPA reaction product to SOD spinal cord mitochondria resulted in a significant increase in the rate of ATP synthesis, as measured by luminescence over the course of 3 minutes, while addition of the non-functional E285A ASPA mutant reaction product did not (FIG. 9). The aspartate content of these reaction products was assessed by HPLC (Table 1) which showed a >800-fold increase in aspartate in wild type ASPA reaction product.

Table 1 shows aspartate content of reaction product following incubation of 50 µl lysates from HeLa cells transfected with wild type ASPA plasmid (WT) or non-functional E285 ASPA (E285A) with 5 mM NAA for 2 hours. Reaction was performed in a 200 µl mix containing 50 mM Tris-HCL (pH 8.0), 50 mM NaCl, 0.5 mM DTT, 0.05% IPEGAL CA630, and 5 mM NAA. Reaction terminated by heating to 95° C. for 3 minutes. 20 µl of reaction mix assayed for aspartate concentration by HPLC analysis of OPA-derivatized samples. 5 individual samples for each transfection group assayed.

TABLE 1

Aspartate content of ASPA activity assays

|  | ASPARTATE CONCENTRATION (µMOL) | ASPARTATE CONTENT IN 50 µL |
|---|---|---|
| WT | 860.67 | 215.1675 |
|  | 978.22 | 244.555 |
|  | 567.83 | 141.9575 |
|  | 1063.22 | 265.805 |
|  | 722.47 | 180.6175 |
| MEAN | 838.482 | 209.6205 |
| SD | 198.265903 | 49.5664759 |
| SEM | 88.6672075 | 22.1668019 |
| E285A | 1.27 | 0.3175 |
|  | 0 | 0 |
|  | 2.11 | 0.5275 |
|  | 0 | 0 |
|  | 0 | 0 |
| MEAN | 0.676 | 0.169 |
| SD | 0.97212653 | 0.24303163 |
| SEM | 0.4347482 | 0.10868705 |

Example 3

AAV-ASPA Treatment of SOD G93A Mice 8-week old male SOD G93A mice were transduced with $1 \times 10^{11}$ AAV9-CBh-ASPA vector genomes (vg) via lumbar intrathecal injection. Mice were anesthetized by inhalation anesthesia (isoflurane, 4% induction, maintenance titrated to effect) and vector delivered in a 5 µl volume. Control animals received 5 µl of physiological saline (0.9%) via the same route of administration (ROA). Animals were tested on an accelerating rotarod (4-40 rpm) once weekly from 9-16 weeks of age. The average latency to fall over 3 consecutive 3-minute trials was recorded (30 second rest period between individual trials). 9-11 weeks were designated as training sessions, and latency to fall at 12, 13, 14, 15, and 16 weeks compared between saline and AAV9-ASPA treated groups (n=15/group). Rotarod analysis was performed by individuals blinded to the treatment group. AAV9-ASPA treated mutant mice presented with a long term improvement in rotarod performance (latency to fall) that was statistically significant at 15 and 16 weeks of age (p=0.0218; 0.0271, respectively).

Figure 10:
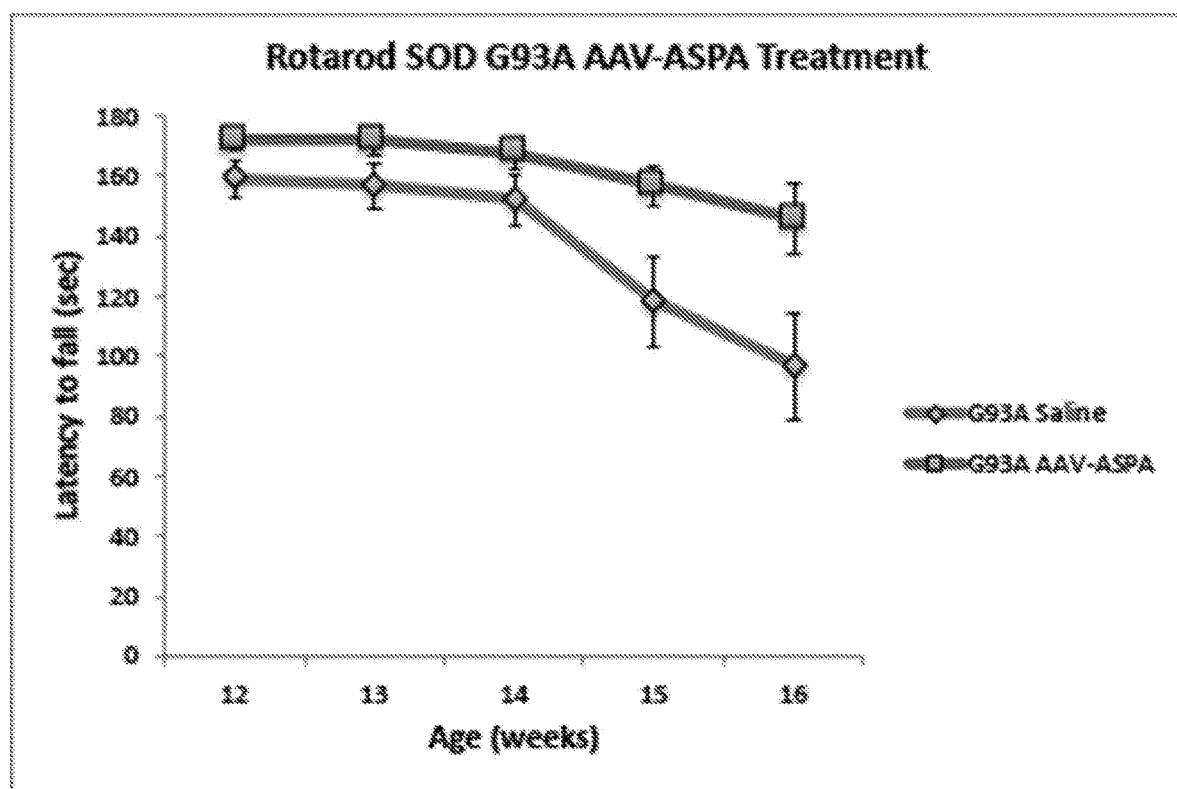
FIG. 10 shows average latency to fall at 12-16 weeks of age in SOD G93A mutant mice treated with either saline of AAV9-ASPA administered intrathecally. The mean of 3 individual trials is presented, with a standard error of the mean (n=15/group).
Figure 11A:
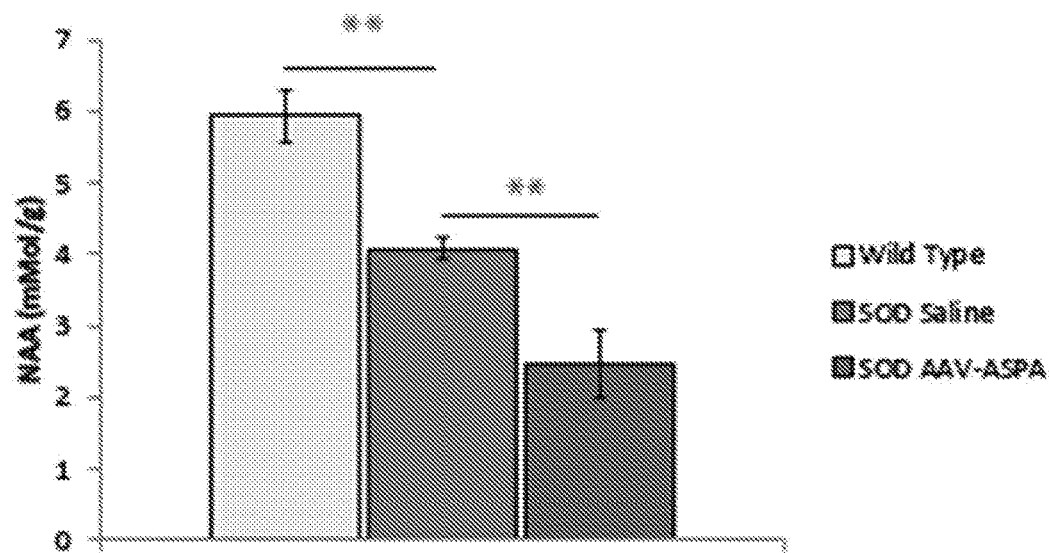
FIGS. 11A and 11B (collectively "FIG. 11") show HPLC analysis of NAA and the adenosine triphosphate (ATP): adenosine monophosphate (AMP) ratio, (hereinafter ATP:AMP ratio) in wild type, saline-treated SOD and AAV9-ASPA-treated SOD 16 week old mice spinal cords. A). A significant reduction in spinal cord NAA is observed in saline SOD mice relative to age-matched wild type, with an associated decrease in the ATP: AMP ratio (B), indicating a pathological decrease in NAA in response to decreased production of ATP relative to use (reflected in levels of AMP). Levels of NAA are further decreased in AAV9-ASPA treated SOD spinal cords, but are associated with a corresponding increase in ATP: AMP, demonstrating increased ATP synthesis.
Figure 11B:
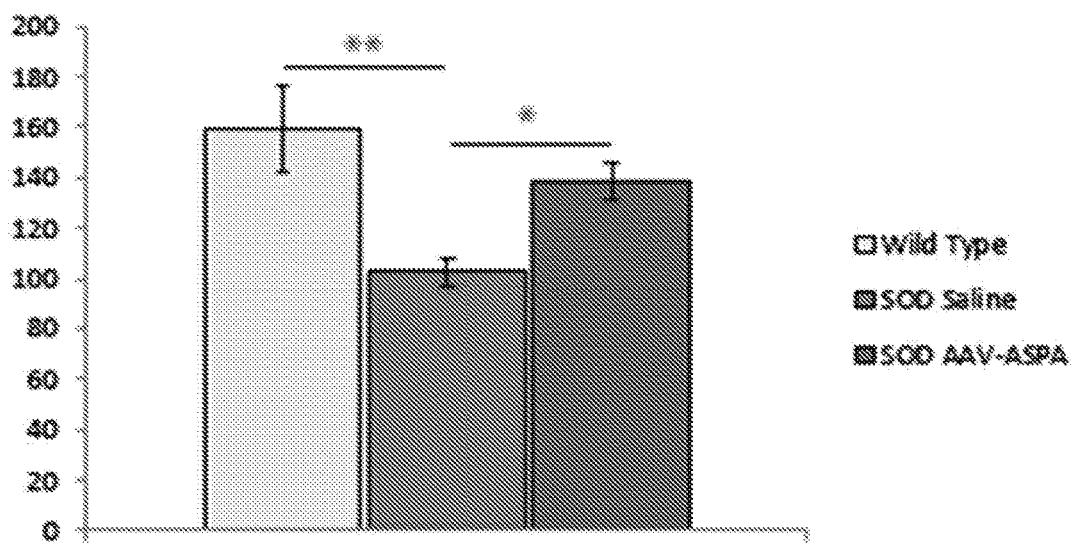

Increased NAA Catabolism in AAV9-ASPA Treated SOD G93A Animals is Associated with an Increased ATP: AMP Ratio NAA is characteristically reduced in association with an increased pathological energetic deficit in a broad spectrum of neurodegenerative disease, including ALS. A central hypothesis of the current study is that this metabolic response is due to an attempted uncoupling of NAA synthesis from mitochondrial oxidative phosphorylation and ATP synthesis on account of a shared requirement for free aspartate by both synthetic processes. Therefore, the liberation of aspartate from endogenous NAA by exogenously supplied ASPA would be expected to support ATP synthesis by mitochondria via shuttling mechanisms that promote the import of cytosolic aspartate to mitochondria for use by the mitochondrial electron transport chain (ETC) as per data presented in FIG. 9. The current intervention is expected to support this hypothesis with data consistent with NAA-supplied aspartate acting as a fuel for the ETC, measured in increased available energetic currency. A primary metric in this context is functionality of the ASPA transgene. The functionality of AAV-delivered ASPA was confirmed in spinal cords isolated from SOD G93A animals at 16 weeks of age, immediately following the 16 week rotarod analysis. Age-matched C57BL/6J wild type (non-SOD) male mice were used as calibration reference controls. The NAA, AMP, and ATP content of spinal cords from AAV9-ASPA and saline control SOD G93A mice were analyzed by HPLC. Whole flash-frozen spinal cords were obtained from 16-week old animals immediately following 16-week rotarod analysis. Whole spinal cords were homogenized in precipitation solution using a mechanical dispersal element and extracted with chloroform. Samples thus prepared were aliquoted and stored at −80° C. for subsequent analysis. Absolute molar concentrations of target metabolites were calculated using standard curves prepared from purified reference standards. 16 week old Saline treated SOD G93A mice presented with a reduction in spinal cord NAA relative to wild type references (p=0.0015, n=5/group; FIG. 11), as per previously reported reductions in this metabolite in both clinical and animal model populations. Saline treated mutant mice spinal cords also presented with a decreased ATP: AMP ratio (p=0.0134), indicating the hydrolysis (i.e. use) of ATP is outpacing its synthesis. SOD G93A AAV9-ASPA treated spinal cords presented with an additional 1.7-fold decrease in NAA relative to Saline treated controls (p-0.011, n=5/group), indicating functionality of the AAV-delivered ASPA transgene, which was associated with a significant increase in the ATP: AMP ratio (p=0.0045), indicating increased ATP production and improved energetic status. This suggests the products of increased NAA catabolism resulting from transduction with AAV9-ASPA support bioavailable energetic currency, with associated benefits for motor function (FIG. 10).

AAV9-ASPA Treated Spinal Cord Mitochondria Display Increased Levels of ATP Synthesis that Appear Relative to NAA-Derived Aspartate Available.

Figure 12:
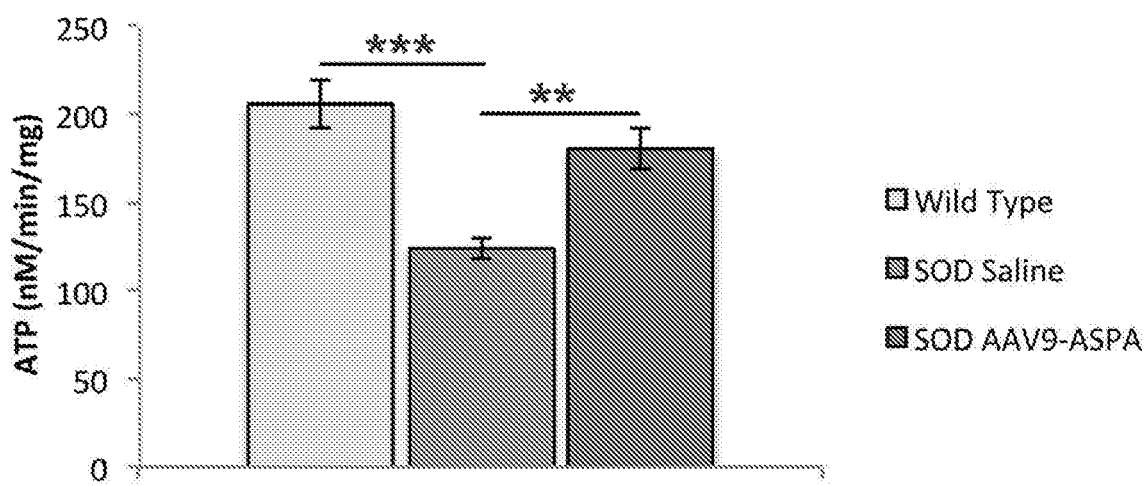
FIG. 12 shows rates of ATP synthesis in mitochondria isolated from wild type, saline-treated SOD and AAV9-ASPA treated SOD spinal cords. Mitochondria were assayed using a commercially available luminescence-based kit. The rate of ATP synthesis in mitochondria isolated from AAV9-ASPA transduced SOD spinal cords was significantly superior to saline-treated SOD spinal cord mitochondria, indicating the provision of NAA-derived aspartate via ASPA gene therapy is an effective means to augmenting energetic metabolism with associated benefits for motor function in ALS. Mean ATP synthesis rate, +/− sem presented (n=5/group).

Intact mitochondria were isolated from spinal cords of Saline and AAV9-ASPA treated SOD G93A mutant mice, and from age-matched wild type controls at 16 weeks of age and used to assess the rate of ATP synthesis using a luminescence-based assay. Mitochondria from each cohort were provided ADP and the rate of conversion to ATP assessed over the course of 3 minutes and presented as a mean rate of ATP synthesis, in nM/min/mg of mitochondrial protein (FIG. 12). Rates of ATP synthesis in 16 week old SOD G93A Saline treated spinal cord mitochondria were reduced 1.7-fold relative to age-matched wild type controls (p=0.00058), indicating pathological energetic crisis. ATP synthesis rates in AAV9-ASPA treated SOD G93A mitochondria were increased significantly over Saline controls (p=0.0022), consistent with an improved ATP: AMP ratio (FIG. 10B), indicating promotion of mitochondrial oxidative metabolism by ASPA catabolic aspartate is able to rescue the deterioration of motor function.

While this invention has been described with an emphasis upon embodiments, it will be obvious to those of ordinary skill in the art that variations in the compositions and methods may be used and that it is intended that the invention may be practiced otherwise than as specifically described herein. Accordingly, this invention includes all modifications encompassed within the spirit and scope of the invention as defined by the claims that follow.

What is claimed is:

1. A method of increasing the amount of neuronal aspartate in the brain and spinal cord or increasing the N-acetylaspartate (NAA) catabolism in the brain or spinal cord to facilitate mitochondrial function in a subject at risk of developing amyotrophic lateral sclerosis (ALS) or suffering from ALS comprising identifying said subject by screening the subject for ALS and administering to the subject a therapeutically effective amount of a composition, wherein the composition comprises a nucleic acid encoding aspartoacylase (ASPA) or a functional fragment thereof, wherein the ASPA or functional fragment thereof comprises an amino acid sequence that is at least 75% identical to the sequence of SEQ ID NO:1 carried on a recombinant adeno-associated virus (rAAV) vector, and wherein the ASPA or functional fragment thereof has the enzymatic activity of aspartoacylase.

2. The method of claim 1, wherein the administration of the composition increases the NAA catabolism in brain or spinal tissue and enhances motor-neuron survival in the subject.

3. The method of claim 1, further comprising administering to the subject a second therapeutic agent.

4. The method of claim 3, wherein the second therapeutic agent is Riluzole, Edaravone, or a salt or solvate thereof or a combination thereof.

5. A method of treating, ameliorating, or reversing at least one symptom of amyotrophic lateral sclerosis (ALS) in a subject having ALS, comprising the steps of:
   a) identifying a patient in need of an increase in intracellular aspartate level; and
   b) administering to the subject a therapeutically effective amount of a composition that increases a level or activity of aspartoacylase (ASPA) in motor neurons of the subject.

6. The method of claim 5, wherein the composition comprises a gene therapy composition.

7. The method of claim 5, wherein the composition comprises a nucleic acid encoding ASPA or a functional fragment thereof, wherein the ASPA or functional fragment thereof comprises an amino acid sequence that is at least 75% identical to the sequence of SEQ ID NO: 1.

8. The method of claim 7, wherein the nucleic acid encoding ASPA or a fragment thereof, comprises an amino acid sequence of SEQ ID NO: 1.

9. The method of claim 7, comprising introducing the nucleic acid to the at least one cell of the subject by viral transduction.

10. The method of claim 9, wherein the composition is provided a virus or a virus-like particle comprising the nucleic acid.

11. The method of claim 10, wherein the nucleic acid is carried on a recombinant adeno-associated virus (rAAV) vector.

12. The method of claim 1, comprising administering the composition to at least a portion of the brain and spinal cord of the subject.

13. The method of claim 1, wherein the composition is administered by a route selected from oral, parenteral, transdermal, pulmonary, intranasal, buccal, intrathecal, and intravenous.

14. The method of claim 13, wherein the composition is administered by an intrathecal route.

15. The method of claim 1, wherein the subject is a mammal.

16. The method of claim 15, wherein the mammal is a human.

17. The method of claim 5, wherein the at least one symptom of ALS is mitochondrial dysfunction.

18. A kit for increasing a level or activity of ASPA in a cell of a subject comprising a rAAV1 vector or a virus-like particle, wherein the virus or the virus-like particle comprises a nucleic acid encoding ASPA or a functional fragment thereof, wherein the ASPA or functional fragment thereof comprises an amino acid sequence that is at least 75% identical to the sequence of SEQ ID NO: 1, and wherein the ASPA or functional fragment thereof has the enzymatic activity of aspartoacylase.

19. The method of claim 1, wherein the administration of the composition delivers said composition to motor neurons.

20. The method of claim 7, wherein the administering step delivers the composition to said motor neurons.

* * * * *